US012430495B2

(12) United States Patent
Lee et al.

(10) Patent No.: US 12,430,495 B2
(45) Date of Patent: Sep. 30, 2025

(54) SYSTEM, APPARATUS, NON-TRANSITORY COMPUTER-READABLE MEDIUM, AND METHOD FOR AUTOMATICALLY GENERATING RESPONSES TO REQUESTS FOR INFORMATION USING ARTIFICIAL INTELLIGENCE

(71) Applicant: LTLW, Inc., Los Angeles, CA (US)

(72) Inventors: James Lee, La Canada, CA (US); Purvank Patel, Malden, MA (US)

(73) Assignee: LTLW, INC., Los Angeles, CA (US)

( * ) Notice: Subject to any disclaimer, the term of this patent is extended or adjusted under 35 U.S.C. 154(b) by 537 days.

(21) Appl. No.: 17/533,130

(22) Filed: Nov. 23, 2021

(65) Prior Publication Data
US 2023/0065089 A1 Mar. 2, 2023

Related U.S. Application Data

(60) Provisional application No. 63/238,582, filed on Aug. 30, 2021.

(51) Int. Cl.
G06F 40/166 (2020.01)
G06F 16/332 (2019.01)
(Continued)

(52) U.S. Cl.
CPC ........ *G06F 40/166* (2020.01); *G06F 16/3322* (2019.01); *G06F 16/3335* (2019.01); *G06F 40/40* (2020.01)

(58) Field of Classification Search
CPC .. G06F 3/0482; G06F 3/04842; G06F 40/166; G06F 16/3322; G06F 16/3323; G06F 16/3335
(Continued)

(56) References Cited

U.S. PATENT DOCUMENTS 6,934,715 B2 8/2005 Kalmes et al.
8,935,149 B2 1/2015 Zhang
(Continued)

FOREIGN PATENT DOCUMENTS

CN 110991180 A 4/2020
CN 113297360 A * 8/2021 ......... G06F 16/3329

OTHER PUBLICATIONS

Chenxi Wang and Xudong Luo. 2022. A Legal Question Answering System Based on BERT . In Proceedings of the 2021 5th International Conference on Computer Science and Artificial Intelligence (CSAI '21). Association for Computing Machinery, New York, NY, USA, 278-283. (Year: 2022).*

(Continued)

Primary Examiner — Richemond Dorvil
Assistant Examiner — Rodrigo A Chavez
(74) Attorney, Agent, or Firm — XSENSUS LLP

(57) ABSTRACT

A document response production method, the method including: receiving, as input, a document with requests for information, wherein each request for information is a text string; displaying a user interface on the display, the user interface simultaneously displaying a document viewer area, a virtual assistant area, and a text editor area; displaying the received document in the document viewer area; receiving, as input, a selected request for information from among the requests for information; displaying, in the virtual assistant area, one or more automatically selected recommended responses to the selected request for information, and displaying, in the virtual assistant area, one or more other selectable potential responses; based on the selected request for information, automatically generating or suggesting a text string response to the selected request for information; and displaying the text string response in the text editor area.

19 Claims, 93 Drawing Sheets

(51) Int. Cl.
*G06F 16/3332* (2025.01)
*G06F 40/40* (2020.01)

(58) Field of Classification Search
USPC ..................................................... 704/9, 257
See application file for complete search history.

(56) References Cited

U.S. PATENT DOCUMENTS

| | | | |
|---|---|---|---|
| 9,336,192 B1 | 5/2016 | Barba et al. | |
| 9,471,559 B2 | 10/2016 | Castelli et al. | |
| 9,471,627 B2 | 10/2016 | Boyle et al. | |
| 9,552,548 B1 | 1/2017 | Brestoff | |
| 9,934,285 B1 | 4/2018 | Rehling et al. | |
| 10,140,273 B2 | 11/2018 | Biegert et al. | |
| 10,303,999 B2 | 5/2019 | Hertz et al. | |
| 10,657,174 B2 | 5/2020 | Master et al. | |
| 10,810,375 B2 | 10/2020 | Mass et al. | |
| 11,386,510 B2* | 7/2022 | Al-Kofahi | G06F 16/332 |
| 2004/0199555 A1* | 10/2004 | Krachman | G06Q 50/16 |
| 2007/0260472 A1* | 11/2007 | Bennett | G11B 27/10 |
| | | | 705/311 |
| 2011/0040553 A1 | 2/2011 | Sasivarman | |
| 2015/0261745 A1 | 9/2015 | Song et al. | |
| 2017/0308790 A1 | 10/2017 | Nogueira dos Santos et al. | |
| 2018/0203921 A1* | 7/2018 | Privault | G06F 16/3323 |
| 2018/0268506 A1 | 9/2018 | Wodetzki et al. | |
| 2020/0250381 A1 | 8/2020 | Guo | |
| 2021/0174016 A1* | 6/2021 | Fox | G06N 3/045 |
| 2021/0216576 A1* | 7/2021 | Staub | G06Q 30/0282 |
| 2021/0294829 A1* | 9/2021 | Bender | G16H 70/60 |
| 2021/0374276 A1* | 12/2021 | Nayak | G06N 5/04 |
| 2022/0004715 A1* | 1/2022 | Patel | G06N 5/022 |
| 2022/0317978 A1* | 10/2022 | Barik | G06F 8/34 |
| 2022/0317979 A1* | 10/2022 | Araujo Soares | G06F 16/9024 |
| 2023/0065089 A1* | 3/2023 | Lee | G06F 40/35 |
| 2023/0116149 A1* | 4/2023 | Radhakrishna | G06F 8/33 |
| | | | 717/110 |

OTHER PUBLICATIONS

Bengio et al., "A Neural Probabilistic Language Model", Journal of Machine Learning Research, 2003, vol. 3, pp. 1137-1155.

Souili et al., "Natural Language Processing (NLP)—A Solution for Knowledge Extraction from Patent Unstructured Data", Procedia Engineering, 2015, vol. 131, pp. 635-643.

Thakur et al., "Augmented SBERT: Data Augmentation Method for Improving Bi-Encoders for Pairwise Sentence Scoring Tasks", arXiv:2010.08240v2 [cs.CL], Apr. 12, 2021, 15 pages.

Achananuparp et al., "The Evaluation of Sentence Similarity Measures", LNCS, 2008, vol. 5182, pp. 305-316.

Smeaton., "Progress in the Application of Natural Language Processing to Information Retrieval Tasks", The Computer Journal, 1992, vol. 35, No. 3, pp. 268-278.

* cited by examiner

100

LEGALMATION® DISCOVERY RESPONSE CREATOR

XXXXXXXXXXXXXXXXX | Request for Production         102

DRAFT RESPONSE EDITOR

    XXXXXXXXX        Go DocGen

REQUEST FOR PRODUCTION NO. 2

Any DOCUMENT consisting of correspondence (mail, fax, e-mail or otherwise) between YOU OR ANYONE ACTING ON YOUR BEHALF and propounding party or anyone acting on propounding party's behalf.

RESPONSE TO REQUEST FOR PRODUCTION NO. 2

Defendant objects on the grounds that it seeks information and documents protected by the attorney-client and work product privilege doctrines. Attached hereto and Bates-stamped XXXXX 11, please find all non-privileged responsive documents.

108

REQUEST FOR PRODUCTION NO. 3

Any DOCUMENT or other evidence (as defined by Evidence Code § 140)(including, but not limited to, incident reports; interoffice memorandum; claim notes; e-mail or other correspondence) which refers to plaintiff XXXXXXXXXXXXXXX.

RESPONSE TO REQUEST FOR PRODUCTION NO. 3          110

B / U | ≡ ≡ ≡ | ≡ ≡ | ∅ Paragraph ▾ <>  

XXXXXX objects on the basis that the question is vague and ambiguous and overbroad and burdensome. XXXXX further objects because the request is not reasonably particularized. The request also asks for information covered by the attorney client privilege and/or attorney work product. Subject to these objections, Responding party responds as follows:

REQUEST FOR PRODUCTION NO. 4

Any DOCUMENT or other evidence (as defined by Evidence Code § 140) (including, but not limited to, incident reports; interoffice memorandum; claim notes; e-mail or other correspondence) which refers to the INCIDENT.

ⓘ Team Notes are available for this Request Number. 104   2 ✓ Completed
                                                     33 ⊖ In Progress

VIRTUAL ASSISTANT  ⬈

OBJECTIONS    CLOSEST MATCHES ～116

114 ▫ Vague/Ambiguous-Specific Term    ▫ Invasion of Privacy
    ▰ *Vague/Ambiguous-Overbroad*      ▫ Irrelevant
112 ▰ *Reasonable Particularity*       ▫ Expert Opinion
    ▰ *Attorney-Client/Work Product*   ▫ Legal Opinion/Conclusion
    ▫ Equally Available
    ▫ Trade Secret/Proprietary Info

DOCUMENT VIEWER ⬈

ORIGINAL REQUEST   RESPONSE LIBRARY   TEAM NOTES

1    REQUEST FOR PRODUCTION

2   REQUEST FOR PRODUCTION NO. 1:
3        Any DOCUMENT or other evidence (as defined by
    Evidence Code §140) (including, but not limited to, insurance
4   policies, declaration pages, certificates of insurance, insurance
5   contracts or agreements, etc.) which refers to any policy of
    insurance (including any and all available excess and/or
6   umbrella policies) through YOU OR ANYONE ACTING ON
7   YOUR BEHALF were or might be insured in any manner for any
    liability, damages, claims actions that have arisen out of the
8                           INCIDENT.
9   REQUEST FOR PRODUCTION NO. 2:
10       Any DOCUMENT consisting of correspondence (mail, fax,
    e-mail, or otherwise) between YOU OR ANYONE ACTING ON
11  YOUR BEHALF and propounding party or anyone acting on
12  propounding party's behalf.
    REQUEST FOR PRODUCTION NO. 3:
13       Any DOCUMENT or other evidence (as defined by
14  Evidence Code §140) (including, but not limited to, incident
    reports: interoffice memorandums: claim notes: email or other
15

LEGALMATION® DISCOVERY RESPONSE CREATOR

XXXXXXXX | XXXXXXXXX | Request for Production   102

DRAFT RESPONSE EDITOR

     XXXXXXXXX   [ Go DocGen ]   

REQUEST FOR PRODUCTION NO. 2

Any DOCUMENT consisting of correspondence (mail, fax, e-mail or otherwise) between YOU OR ANYONE ACTING ON YOUR BEHALF and propounding party or anyone acting on propounding party's behalf.

RESPONSE TO REQUEST FOR PRODUCTION NO. 2

Defendant objects on the grounds that it seeks information and documents protected by the attorney-client and work product privilege doctrines. Attached hereto and Bates-stamped XXXXX 11, please find all non-privileged responsive documents.

REQUEST FOR PRODUCTION NO. 3

Any DOCUMENT or other evidence (as defined by Evidence Code § 140)(including, but not limited to, incident reports; interoffice memorandum; claim notes; e-mail or other correspondence) which refers to plaintiff XXXXXXXXXXXXXX.

RESPONSE TO REQUEST FOR PRODUCTION NO. 3   110

[ B / U ≡ ≡ ≡ ≡ ≡ | ✎ Paragraph ▾ <> | 🖫 ]

XXXXXX objects on the basis that the question is vague and ambiguous and overbroad and burdensome XXXXX. further objects because the request is not reasonably particularized. The request also asks for information covered by the attorney client privilege and/or attorney work product. Subject to these objections, Responding party responds as follows:

REQUEST FOR PRODUCTION NO. 4

Any DOCUMENT or other evidence (as defined by Evidence Code § 140) (including, but not limited to, incident reports; interoffice memorandum; claim notes; e-mail or other correspondence) which refers to the INCIDENT.

FIG. 1BA

Ⓐ
ⓘ Doc Production Available for this Request. Click eDiscovery Icon to process.
ⓘ Team Notes are available for this Request Number.

2 ✓ Completed
33 ⊖ In Progress

104

VIRTUAL ASSISTANT
OBJECTIONS    CLOSEST MATCHES ~116

Any DOCUMENT that refers to plaintiff.
Any REPORTS CONCERNING PLAINTIFF.
Any STATEMENTS referring or relating to PLAINTIFF.
Any SURVEILLANCE such as video or audio tapes that refer or relate to PLAINTIFF.
118
DOCUMENTS evidencing INCIDENT REPORTS concerning PLAINTIFF.

DOCUMENT VIEWER    ~122
ORIGINAL REQUEST    RESPONSE LIBRARY    TEAM NOTES

| | |
|---|---|
| 1 | 120    REQUEST FOR PRODUCTION    124 |
| 2 | REQUEST FOR PRODUCTION NO. 1: |
| 3 | Any DOCUMENT or other evidence (as defined by |
| 4 | Evidence Code §140) (including, but not limited to, insurance |
| 5 | policies, declaration pages, certificates of insurance, insurance contracts or agreements, etc.) which refers to any policy of insurance (including any and all available excess and/or |
| 6 | umbrella policies) through YOU OR ANYONE ACTING ON |
| 7 | YOUR BEHALF were or might be insured in any manner for any liability, damages, claims actions that have arisen out of the |
| 8 | INCIDENT. |
| 9 | REQUEST FOR PRODUCTION NO. 2: |
| 10 | Any DOCUMENT consisting of correspondence (mail, fax, e-mail, or otherwise) between YOU OR ANYONE ACTING ON |
| 11 | YOUR BEHALF and propounding party or anyone acting on |
| 12 | propounding party's behalf. |
| 13 | REQUEST FOR PRODUCTION NO. 3: |
| 14 | Any DOCUMENT or other evidence (as defined by Evidence Code §140) (including, but not limited to, incident |
| 15 | reports: interoffice memorandums: claim notes: email or other |

LEGALMATION® DISCOVERY RESPONSE CREATOR

XXXXXXXXXXXXXXXX | Request for Production

DRAFT RESPONSE EDITOR

XXXXXXXXXX  [ Go DocGen ]

REQUEST FOR PRODUCTION NO. 2

Any DOCUMENT consisting of correspondence (mail, fax, e-mail or otherwise) between YOU OR ANYONE ACTING ON YOUR BEHALF and propounding party or anyone acting on propounding party's behalf.

RESPONSE TO REQUEST FOR PRODUCTION NO. 2

Defendant objects on the grounds that it seeks information and documents protected by the attorney-client and work product privilege doctrines. Attached hereto and Bates-stamped XXXXX 11, please find all non-privileged responsive documents.

REQUEST FOR PRODUCTION NO. 3

Any DOCUMENT or other evidence (as defined by Evidence Code § 140)(including, but not limited to, incident reports; interoffice memorandum; claim notes; e-mail or other correspondence) which refers to plaintiff XXXXXXXXXXXXXX.

RESPONSE TO REQUEST FOR PRODUCTION NO. 3      110

| B I U ≡ ≡ ≡ ≡ ≡ | Paragraph ▾ |

XXXXXX objects on the basis that the question is vague and ambiguous and overbroad and burdensome. XXXXX further objects because the request is not reasonably particularized. The request also asks for information covered by the attorney client privilege and/or attorney work product. Subject to these objections, Responding party responds as follows: XXXXX will produce all responsive, non-privileged documents in its possession, custody or control Bates-stamped X to Y.

REQUEST FOR PRODUCTION NO. 4

Any DOCUMENT or other evidence (as defined by Evidence Code § 140) (including, but not limited to, incident reports; interoffice memorandum; claim notes; e-mail or other correspondence) which refers to the INCIDENT.

RESPONSE TO REQUEST FOR PRODUCTION NO. 4

FIG. 1CA

Ⓐ
ⓘ Doc Production Available for this Request. Click eDiscovery Icon to process.

ⓘ Team Notes are available for this Request Number.

2 ✓ Completed
33 ⊖ In Progress

VIRTUAL ASSISTANT
OBJECTIONS   CLOSEST MATCHES

DOCUMENT VIEWER
ORIGINAL REQUEST   RESPONSE LIBRARY   TEAM NOTES
       120                 122                124

| Request | Response |
|---|---|
| ALL DOCUMENTS which refers to plaintiff XXXXXXXX XXXXXXXX | Defendant objects on the grounds that it seeks information and documents protected by the attorney-client and work product privilege doctrines. Attached hereto and Bates-stamped XXXXXXXXX, please find all non-privileged responsive documents. |
| Any INCIDENT REPORT which describe or refer to the INCIDENT, other than notes prepared by responding party's counsel concerning witness interviews conducted by counsel. | Defendant objects on the grounds that it seeks information and documents protected by the attorney-client and work product privilege doctrines, including those documents prepared in anticipation of litigation by claims management. Attached hereto and Bates-stamped XXXXXX, please find all non-privileged responsive documents. |
| Any DOCUMENT or other evidence (including, but not limited to, incident reports; interoffice memorandums; claim notes; e-mail or other correspondence) which refers to plaintiff XXXX XXXXXXXXX | Defendant objects on the grounds that it seeks information and documents protected by the attorney-client and work product privilege doctrines. Attached hereto and Bates-stamped XXXXXX, please find all non-privileged responsive documents. |

LEGALMATION® DISCOVERY RESPONSE CREATOR

XXXXXXXXXXXXXXXX | Request for Production

DRAFT RESPONSE EDITOR

XXXXXXXXXX    Go DocGen

REQUEST FOR PRODUCTION NO. 2

Any DOCUMENT consisting of correspondence (mail, fax, e-mail or otherwise) between YOU OR ANYONE ACTING ON YOUR BEHALF and propounding party or anyone acting on propounding party's behalf.

RESPONSE TO REQUEST FOR PRODUCTION NO. 2

Defendant objects on the grounds that it seeks information and documents protected by the attorney-client and work product privilege doctrines. Attached hereto and Bates-stamped XXXXXXX, please find all non-privileged responsive documents.

REQUEST FOR PRODUCTION NO. 3

Any DOCUMENT or other evidence (as defined by Evidence Code § 140)(including, but not limited to, incident reports; interoffice memorandum; claim notes; e-mail or other correspondence) which refers to plaintiff XXXXXXXXXXXXXXX.

RESPONSE TO REQUEST FOR PRODUCTION NO. 3

B I U  ≡ ≡ ≡  ≡ ≡  Paragraph ▾

XXXXXX objects on the basis that the question is vague and ambiguous and overbroad and burdensome. XXXXX further objects because the request is not reasonably particularized. The request also asks for information covered by the attorney client privilege and/or attorney work product. Subject to these objections, Responding party responds as follows: XXXXX will produce all responsive, non-privileged documents in its possession, custody or control Bates-stamped X to Y.

REQUEST FOR PRODUCTION NO. 4

Any DOCUMENT or other evidence (as defined by Evidence Code § 140) (including, but not limited to, incident reports; interoffice memorandum; claim notes; e-mail or other correspondence) which refers to the INCIDENT.

RESPONSE TO REQUEST FOR PRODUCTION NO. 4

FIG. 1DA

Ⓐ
ⓘ Doc Production Available for this Request. Click eDiscovery Icon to process.

ⓘ Team Notes are available for this Request Number.

2 ✓ *Completed*
33 ⊖ *In Progress*

---

VIRTUAL ASSISTANT 🗗
OBJECTIONS    CLOSEST MATCHES

---

DOCUMENT VIEWER ✎

ORIGINAL REQUEST    RESPONSE LIBRARY    TEAM NOTES
⎿120                ⎿122                ⎿124

| Request | Notes | Author |
|---------|-------|--------|
| 3 | Sue Cleveland heard that there may be some incident reports may contain sensitive attorney client information. Pay special attention to redact where necessary. | TS |
| 10 | Is asking for surveillance records. Again need to speak to Jenny Townsend inhouse for more info before answering this question | TS |

LEGALMATION® DISCOVERY RESPONSE CREATOR

XXXXXXXXXXXXXXXX | Request for Production

DRAFT RESPONSE EDITOR

XXXXXXXXX    Go DocGen

REQUEST FOR PRODUCTION NO. 2

Any DOCUMENT or other evidence (as defined by Evidence Code § 140)(including, but not limited to, incident reports; interoffice memorandum; claim notes; e-mail or other correspondence) which refers to plaintiff XXXXXXXXXXXXXXXX

RESPONSE TO REQUEST FOR PRODUCTION NO. 3

XXXXXX objects on the basis that the question is vague and ambiguous and overbroad and burdensome. XXXXXX further objects because the request is not reasonably particularized. The request also asks for information covered by the attorney client privilege and/or attorney work product. Subject to these objections, Responding party responds as follows: XXXXXXX will produce all responsive, non-privileged documents in its possession, custody or control Bates-stamped XXXXXXX 89.

REQUEST FOR PRODUCTION NO. 4

Any DOCUMENT or other evidence (as defined by Evidence Code § 140)(including, but not limited to, incident reports; interoffice memorandum; claim notes; e-mail or other correspondence) which

| Vague/Ambiguous. Term/Phrase ▶ |
| Add Custom Objection ▶ | ~128
| Add Team Notes ▶ |

RESPONSE TO

B *I* U ≡ ≡ ≡

XXXXXX objects on the basis that the question is vague and ambiguous and overbroad and burdensome. XXXXX further objects because the request is not reasonably particularized. The request also asks for information covered by the attorney client privilege and/or attorney work product. Subject to these objections, Responding party responds as follows:

REQUEST FOR PRODUCTION NO. 5

Any witness statements which describe or refer to the INCIDENT, other than notes prepared by responding party's counsel conducted by counsel.

RESPONSE TO REQUEST FOR PRODUCTION NO. 5

2 ✓ Completed
33 ⊖ In Progress

VIRTUAL ASSISTANT 🗗
<u>OBJECTIONS</u>  CLOSEST MATCHES

- ☐ Vague/Ambiguous-Specific Term
- ☒ *Vague/Ambiguous-Overbroad*
- ☒ *Reasonable Particularity*
- ☒ *Attorney-Client/Work Product*
- ☐ Equally Available
- ☐ Trade Secret/Proprietary Info
- ☐ Invasion of Privacy
- ☐ Irrelevant
- ☐ Expert Opinion
- ☐ Legal Opinion/Conclusion

DOCUMENT VIEWER 🗗
<u>ORIGINAL REQUEST</u>  RESPONSE LIBRARY  TEAM NOTES

9 | INCIDENT.
10 | <u>REQUEST FOR PRODUCTION NO. 2:</u>
11 |     Any DOCUMENTS consisting of correspondence ( mail, fax, e-mail, or otherwise ) between YOU OR ANYONE ACTING
12 | ON YOUR BEHALF and propounding party or anyone acting on propounding party's behalf.
13 | <u>REQUEST FOR PRODUCTION NO. 3:</u>
14 |     Any DOCUMENTS or other evidence (as defined by
15 | Evidence Code §140) (including, but not limited to, incident reports; interoffice memorandum; claim notes; email or other
16 | correspondence ) which refers to plaintiff XXXXXXXX
17 | <u>REQUEST FOR PRODUCTION NO. 4:</u>
18 |     Any DOCUMENTS or other evidence (as defined by
19 | Evidence Code §140) (including, but not limited to, incident reports; interoffice memorandums; claim notes; email or other
20 | correspondence) which refers to the INCIDENTS:
21 | <u>REQUEST FOR PRODUCTION NO. 5:</u>
22 |     Any witness statements which describe or refers to the
23 | INCIDENTS, other than notes prepared by responding party"s counsel concerning witness interviews conducted by counsel.
24 | <u>REQUEST FOR PRODUCTION NO. 6:</u>
25 |     Any DOCUMENTS or other evidence (as defined by Evidence Code §140) which

| 114 VIRTUAL ASSISTANT | 115 | |
|---|---|---|
| OBJECTIONS | RANKED RESPONSES | CUSTOM RESPONSES |

☐ Defendant will produce non-privileged documents responsive to this request (Bates Labeled X to Y). — 49%

119
☑ *Due to their proprietary nature, responsive documents will only be produced pursuant to a mutually agreed upon stipulation for protective order.* — 117  35%

☐ Defendant has no documents responsive to this request, as such documents never existed. — 9%

☐ [MISC RESPONSE(S) IDENTIFIED - PLS SEE RESPONSE LIBRARY FOR RESPONSES] — 8%

🧑 LOG OFF ⚙ PREFERENCES

Dialogue Box ⚙         204         2 ☑ *Completed*
                                      33 ■ *In Progress*

| No. | Request | Status |
|---|---|---|
| 2. | Any DOCUMENT consisting of correspondence (mail, fax, e-mail or otherwise) between YOU OR ANYONE ACTING ON YOUR BEHALF and propounding party or anyone acting on propounding party's behalf. | ☑ 218 |
| 3. | Any DOCUMENT or other evidence (as defined by Evidence Code § 140)(including, but not limited to, incident reports; interoffice memorandum; claim notes; e-mail or other correspondence) which refers to plaintiff XXXXXXXXX | ■ |
| 4. | Any DOCUMENT or other evidence (as defined by Evidence Code § 140) (including, but not limited to, incident reports; interoffice memorandum; claim notes; e-mail or other correspondence) which refers to the INCIDENT | ■ |

206

Closest Matches ⚙                          206

☐ Any DOCUMENT that refers to plaintiff.
☐ Any REPORTS CONCERNING PLAINTIFF.
☐ Any STATEMENTS referring or relating to PLAINTIFF.
☐ Any SURVEILLANCE such as video or audio tapes that refer or relate to PLAINTIFF.
☐ DOCUMENTS evidencing INCIDENT REPORTS concerning PLAINTIFF.
─ S202

Next 5 ▶   Prior ◀      🖉 Add Comments/Notes

Suggested Objection ⚙  208

☑ Vague/Ambiguous
☐ Compound
☐ Trade Secret
☑ Reasonable Particularity
☑ Attorney-Client/Work Product
☐ Legal Conclusion
☑ Equally Available

210  🖉 Add Comments/Notes

Client Model Response ⚙     💾 SAVE-IN PROGRESS   💾 SAVE-FINAL

Edit ▾ Format ▾ Insert ▾ Table ▾ View ▾ Tools ▾  ↶ ↷ B I Formats ▾ ≡ ≡ 🔗 📎

XXXXXXX objects on the basis that the question is vague and ambiguous and overbroad and burdensome. XXXXXX further objects because the request is not reasonably particularized. The request also asks for information covered by the attorney client privilege and/or attorney work product. Moreover, the request is equally available to the propounding party. Subject to these objections, Responding party responds as follows XXXXXXX will produce all responsive, non-privileged documents in its possession, custody or control at Bates Labels ranges X to Y.

🖉 Add Comments/Notes

LEGALMATION® DISCOVERY RESPONSE CREATOR

📂 OPEN  💾 SAVE  ⬇ [DELIVERY ⇅]  XXXXXXXX  👥  [XXXXXX ⇅]

XXXXXXX   XXXXXXX  |12356-001|  Request for Production

Document and Response Viewer ⚙

📄 ORIGINAL REQUESTS     📊 RESPONSE LIBRARY     👍 TEAM NOTES     🖨 PRINT PREVIEW

S204    214    🔍 Type in Search Here    216

| Request | Response |
|---|---|
| ALL DOCUMENTS which refers to plaintiff XXXXXXXX | Defendant objects on the grounds that it seeks information and documents protected by the attorney-client and work product privilege doctrines. Attached hereto and Bates-stamped XXXXXXXXX, please find all non-privileged responsive documents. |
| Any INCIDENT REPORT which describe or refer to the INCIDENT, other than notes prepared by responding party's counsel concerning witness interviews conducted by counsel. | Defendant objects on the grounds that it seeks information and documents protected by the attorney-client and work product privilege doctrines, including those documents prepared in anticipation of litigation by claims management. Attached hereto and Bates-stamped XXXXXXX, please find all non-privileged responsive documents. |
| Any DOCUMENT or other evidence (including, but not limited to, incident reports; interoffice memorandums; claim notes; e-mail or other correspondence) which refers to plaintiff XXXX XXXXX | Defendant objects on the grounds that it seeks information and documents protected by the attorney-client and work product privilege doctrines. Attached hereto and Bates-stamped XXXXXXX, please find all non-privileged responsive documents. |

👤 LOG OFF ⚙ PREFERENCES

Dialogue Box ⚙      2 ☑ *Completed*
    33 ■ *In Progress*

| No. | Request | Status |
|---|---|---|
| 2. | Any DOCUMENT consisting of correspondence (mail, fax, e-mail or otherwise) between YOU OR ANYONE ACTING ON YOUR BEHALF and propounding party or anyone acting on propounding party's behalf. | ☑ |
| 3. | Any DOCUMENT or other evidence (as defined by Evidence Code § 140)(including, but not limited to, incident reports; interoffice memorandum; claim notes; e-mail or other correspondence) which refers to plaintiff XXXXXXXXX | ■ |
| 4. | Any DOCUMENT or other evidence (as defined by Evidence Code § 140) (including, but not limited to, incident reports; interoffice memorandum; claim notes; e-mail or other correspondence) which refers to the INCIDENT | ■ |

Closest Matches ⚙
- Any DOCUMENT that refers to plaintiff.
- Any REPORTS CONCERNING PLAINTIFF.
- Any STATEMENTS referring or relating to PLAINTIFF.
- Any SURVEILLANCE such as video or audio tapes that refer or relate to PLAINTIFF.
- DOCUMENTS evidencing INCIDENT REPORTS concerning PLAINTIFF.

Next 5 ▶ Prior ◀    🖉 Add Comments/Notes

Suggested Objection ⚙
- ☑ Vague/Ambiguous
- ☐ Compound
- ☐ Trade Secret
- ☑ Reasonable Particularity
- ☑ Attorney-Client/Work Product
- ☐ Legal Conclusion
- ☑ Equally Available

🖉 Add Comments/Notes

Client Model Response ⚙    💾 SAVE-IN PROGRESS    💾 SAVE-FINAL

Edit ▾ Format ▾ Insert ▾ Table ▾ View ▾ Tools ▾ | ↶ ↷ B I Formats ▾ ≡ ≡ 🔗 📎

XXXXXXX objects on the basis that the question is vague and ambiguous and overbroad and burdensome. XXXXXX further objects because the request is not reasonably particularized. The request also asks for information covered by the attorney client privilege and/or attorney work product. Moreover, the request is equally available to the propounding party. Subject to these objections, Responding party responds as follows XXXXXXX will produce all responsive, non-privileged documents in its possession, custody or control at Bates Labels ranges X to Y.

🖉 Add Comments/Notes

Dialogue Box ⚙

2 ☑ *Completed*
33 ■ *In Progress*

👤 LOG OFF  ⚙ PREFERENCES

| No. | Request | Status |
|---|---|---|
| 2. | Any DOCUMENT consisting of correspondence (mail, fax, e-mail or otherwise) between YOU OR ANYONE ACTING ON YOUR BEHALF and propounding party or anyone acting on propounding party's behalf. | ☑ |
| 3. | Any DOCUMENT or other evidence (as defined by Evidence Code § 140)(including, but not limited to, incident reports; interoffice memorandum; claim notes; e-mail or other correspondence) which refers to plaintiff XXXXXXXXX | ■ |
| 4. | Any DOCUMENT or other evidence (as defined by Evidence Code § 140) (including, but not limited to, incident reports; interoffice memorandum; claim notes; e-mail or other correspondence) which refers to the INCIDENT | ■ |

Closest Matches ⚙

- Any DOCUMENT that refers to plaintiff.
- Any REPORTS CONCERNING PLAINTIFF.
- Any STATEMENTS referring or relating to PLAINTIFF.
- Any SURVEILLANCE such as video or audio tapes that refer or relate to PLAINTIFF.
- DOCUMENTS evidencing INCIDENT REPORTS concerning PLAINTIFF.

Next 5 ▶  Prior ◀   📋 Add Comments/Notes

Suggested Objection ⚙

- ☑ Vague/Ambiguous
- ☐ Compound
- ☐ Trade Secret
- ☑ Reasonable Particularity
- ☑ Attorney-Client/Work Product
- ☐ Legal Conclusion
- ☑ Equally Available

210  📋 Add Comments/Notes

Client Model Response ⚙   💾 SAVE-IN PROGRESS  💾 SAVE-FINAL

Edit ▾ Format ▾ Insert ▾ Table ▾ View ▾ Tools ▾ | ↶ ↷ B I Formats ▾ ≡ 🔗 📎  —S206

XXXXXXX objects on the basis that the question is vague and ambiguous and overbroad and burdensome. XXXXXX further objects because the request is not reasonably particularized. The request also asks for information covered by the attorney client privilege and/or attorney work product. Moreover, the request is equally available to the propounding party. Subject to these objections, Responding party responds as follows XXXXXXX will produce all responsive, non-privileged documents in its possession, custody or control at Bates Labels ranges X to Y.

📋 Add Comments/Notes

Dialogue Box ⚙

2 ☑ *Completed*
33 ■ *In Progress*

| No. | Request | Status |
|---|---|---|
| 2. | Any DOCUMENT consisting of correspondence (mail, fax, e-mail or otherwise) between YOU OR ANYONE ACTING ON YOUR BEHALF and propounding party or anyone acting on propounding party's behalf. | ☑ |
| 3. | Any DOCUMENT or other evidence (as defined by Evidence Code § 140)(including, but not limited to, incident reports; interoffice memorandum; claim notes; e-mail or other correspondence) which refers to plaintiff XXXXXXXXX | ☑ |
| 4. | Any DOCUMENT or other evidence (as defined by Evidence Code § 140) (including, but not limited to, incident reports; interoffice memorandum; claim notes; e-mail or other correspondence) which refers to the INCIDENT | ■ |

218, 220, 222

Closest Matches ⚙

- Any DOCUMENT that refers to plaintiff.
- Any REPORTS CONCERNING PLAINTIFF.
- Any STATEMENTS referring or relating to PLAINTIFF.
- Any SURVEILLANCE such as video or audio tapes that refer or relate to PLAINTIFF.
- DOCUMENTS evidencing INCIDENT REPORTS concerning PLAINTIFF.

Next 5 ▶  Prior ◀   Add Comments/Notes

Suggested Objection ⚙

- ☑ Vague/Ambiguous
- ☐ Compound    ☐ Info Avail to Both Parties
- ☐ Trade Secret
- ☑ Reasonable Particularity    ☐ Objection 11    ☐ Objection 12
- ☑ Attorney-Client/ Work Product
- ☐ Legal Conclusion
- ☑ Equally Available
- ☐ Conclusory/Assumes Facts Add Comments/Notes

Client Model Response ⚙    SAVE-IN PROGRESS    SAVE-FINAL

Edit ▼ Format ▼ Insert ▼ Table ▼ View ▼ Tools ▼ | ↶ ↷ B I Formats ▼ ≡ ≡ ⌘ ⌘

XXXXXXX objects on the basis that the question is vague and ambiguous and overbroad and burdensome. ACME further objects because the request is not reasonably particularized. The request also asks for information covered by the attorney client privilege and/or attorney work product. Moreover, the request is equally available to the propounding party. Subject to these objections, Responding party responds as follows XXXXXXX will produce all responsive, non-privileged documents in its possession, custody or control at Bates Labels ranges X to Y.

Add Comments/Notes

FIG. 2EB

LEGALMATION® DISCOVERY RESPONSE CREATOR

📂 OPEN  💾 SAVE  ⬇ DELIVERY ⇕  XXXXXXXX  👥  XXXXXX ⇕     202

XXXXXXX  XXXXXXX | 12356-001 | Request for Production

Document and Response Viewer ⚙

📄 ORIGINAL REQUESTS   📊 RESPONSE LIBRARY   👍 TEAM NOTES   📑 PRINT PREVIEW

S208   212   🔍 Type in Search Here      S210

3  REQUEST FOR PRODUCTION NO. 1:
4       Any DOCUMENT or other evidence (as defined by Evidence
5   Code §140) (including, but not limited to, insurance policies,
    declaration pages, certificates of insurance, insurance contracts or
6   agreements, etc.) which refers to any policy of insurance (including
7   any and all available excess and/or umbrella policies) through YOU
    OR ANYONE ACTING ON YOUR BEHALF were or might be
8   insured in any manner for any liability, damages, claims actions that
9            have arisen out of the INCIDENT.
10 REQUEST FOR PRODUCTION NO. 2:
11       Any DOCUMENT consisting of correspondence ( mail, fax,
   e-mail, or otherwise ) between YOU OR ANYONE ACTING ON
12 YOUR BEHALF and propounding party or anyone acting on
13 propounding party's behalf.
14 REQUEST FOR PRODUCTION NO. 3:
15       Any DOCUMENT or other evidence (as defined by Evidence
   Code §140) (including, but not limited to, incident reports, interoffice
16 memorandum; claim notes; email or other correspondence ) which
17          refers to plaintiff XXXXXXXX
18 REQUEST FOR PRODUCTION NO. 4:
19       Any DOCUMENT or other evidence (as defined by Evidence
   Code §140) (including, but not limited to, incident reports: interoffice
20 memorandums: claim notes: email or other correspondence) which
21          refers to the INCIDENTS:
22 REQUEST FOR PRODUCTION NO. 5:
23       Any witness statements which describe or refers to the
   INCIDENTS, other than notes prepared by responding party"s
24 counsel concerning witness interviews conducted by counsel.
25 REQUEST FOR PRODUCTION NO. 6:
26       Any DOCUMENT or other evidence (as defined by
   Evidence Code §140) which memorializes, describes or refers
27 to any inspection of the floor of the SUBJECT PREMISES
28         conducted on the date of the INCIDENT.

👤 LOG OFF    ⚙ PREFERENCES

| Dialogue Box ⚙    204 | 2 ☑ *Completed* |
|---|---|
| | 33 ■ *In Progress* |

| No. | Request | Status |
|---|---|---|
| 2. | Any DOCUMENT consisting of correspondence (mail, fax, e-mail or otherwise) between YOU OR ANYONE ACTING ON YOUR BEHALF and propounding party or anyone acting on propounding party's behalf. | ☑   218 |
| 3. | Any DOCUMENT or other evidence (as defined by Evidence Code § 140)(including, but not limited to, incident reports; interoffice memorandum; claim notes; e-mail or other correspondence) which refers to plaintiff XXXXXXXXX | ■ |
| 4. | Any DOCUMENT or other evidence (as defined by Evidence Code § 140) (including, but not limited to, incident reports; interoffice memorandum; claim notes; e-mail or other correspondence) which refers to the INCIDENT | ■ |

Closest Matches ⚙    206

- Any DOCUMENT that refers to plaintiff .
- Any REPORTS CONCERNING PLAINTIFF.
- Any STATEMENTS referring or relating to PLAINTIFF.
- Any SURVEILLANCE such as video or audio tapes that refer or relate to PLAINTIFF.
- DOCUMENTS evidencing INCIDENT REPORTS concerning PLAINTIFF.

Next 5 ▶   Prior ◀    🖉 Add Comments/Notes

Suggested Objection ⚙    208

- ☒ Vague/Ambiguous
- ☐ Compound
- ☐ Trade Secret
- ☒ Reasonable Particularity
- ☒ Attorney-Client/Work Product
- ☐ Legal Conclusion
- ☒ Equally Available

210 🖉 Add Comments/Notes

Client Model Response ⚙      💾 SAVE-IN PROGRESS    💾 SAVE-FINAL

| Edit ▼ Format ▼ Insert ▼ Table ▼ View ▼ Tools ▼ | ↶ ↷ B I Formats ▼ ≡ ≡ 🔗 📎 |

XXXXXXX objects on the basis that the question is vague and ambiguous and overbroad and burdensome. XXXXXX further objects because the request is not reasonably particularized. The request also asks for information covered by the attorney client privilege and/or attorney work product. Moreover, the request is equally available to the propounding party. Subject to these objections, Responding party responds as follows XXXXXXX will produce all responsive, non-privileged documents in its possession, custody or control at Bates Labels ranges X to Y.

🖉 Add Comments/Notes

🧑 LOG OFF  ⚙ PREFERENCES

Dialogue Box ⚙   204   2 ☑ *Completed*
33 ■ *In Progress*

| No. | Request | Status |
|---|---|---|
| 2. | Any DOCUMENT consisting of correspondence (mail, fax, e-mail or otherwise) between YOU OR ANYONE ACTING ON YOUR BEHALF and propounding party or anyone acting on propounding party's behalf. | ☑ 218 |
| 3. | Any DOCUMENT or other evidence (as defined by Evidence Code § 140)(including, but not limited to, incident reports; interoffice memorandum; claim notes; e-mail or other correspondence) which refers to plaintiff XXXXXXXXX | ■ |
| 4. | Any DOCUMENT or other evidence (as defined by Evidence Code § 140) (including, but not limited to, incident reports; interoffice memorandum; claim notes; e-mail or other correspondence) which refers to the INCIDENT | ■ |

Closest Matches ⚙   206

☐ Any DOCUMENT that refers to plaintiff.
☐ Any REPORTS CONCERNING PLAINTIFF.
☐ Any STATEMENTS referring or relating to PLAINTIFF.
☐ Any SURVEILLANCE such as video or audio tapes that refer or relate to PLAINTIFF.
☐ DOCUMENTS evidencing INCIDENT REPORTS concerning PLAINTIFF.

Next 5 ▶  Prior ◀   🗨 Add Comments/Notes

Suggested Objection ⚙   208

☑ Vague/Ambiguous
☐ Compound
☐ Trade Secret
☑ Reasonable Particularity
☑ Attorney-Client/Work Product
☐ Legal Conclusion
☑ Equally Available

210 🗨 Add Comments/Notes

Client Model Response ⚙   💾 SAVE-IN PROGRESS   💾 SAVE-FINAL

[ Edit ▼  Format ▼  Insert ▼  Table ▼  View ▼  Tools ▼ | ↶ ↷ B I Formats ▼ ≡ ≡ 🔗 📎 ]

XXXXXXX objects on the basis that the question is vague and ambiguous and overbroad and burdensome. XXXXXX further objects because the request is not reasonably particularized. The request also asks for information covered by the attorney client privilege and/or attorney work product. Moreover, the request is equally available to the propounding party. Subject to these objections, Responding party responds as follows XXXXXXX will produce all responsive, non-privileged documents in its possession, custody or control at Bates Labels ranges X to Y.

🗨 Add Comments/Notes

Input ~ S402

WHAT? Client Organization collects Past Documents to show Source Document and Target Document. Examples include:
- Requests for Productions (Requests + Responses)
- Interrogatories (Requests + Responses)
- Requests for Admissions (Requests + Responses)
- Subpoenas (Requests + Responses)
- Demand Letters (Demand Letter + Response)
- [NOTE]: training samples will depend...could be > 500 per doc type]

HOW? Uploads VIA 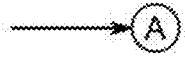
- FTP
- Web-based Drag and Drop Upload UI
- Etc

WHY? Provides training data for Pairwise Sentence Matching used for the Historical Data Warehouse

FIG. 3A

Data Prep — S404

WHAT? Sorting/Extracting/Normalizing
- Doc Type
- Extracting Requests/Demands
- Request/Demand-Response Pair
- Pre-Processing (e.g., Stop Words, Masking)

HOW? Sort and Structure
- RegEx (Domain Specific)
- AI techniques
- ML techniques
- Active Learning
- Human Annotation WHY? Critical Step to ensure consistency of training data in next series of steps

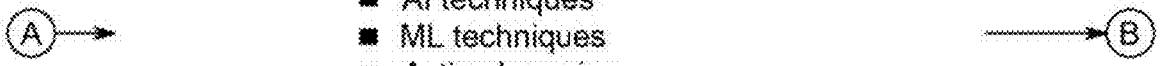

Request:
All DOCUMENTS regarding customer satisfaction index results on the 2020 Toyota Tacoma model vehicles from 2020 to the present.

Response:
Toyota objects to this request based on the "index results" is vague and ambiguous and the information sought is confidential and a protectible trade secret. Subject to and without waiving these objections, Toyota will produce relevant documents after the Court executes a signed protective order by the parties.

FIG. 3B

AI/ML NLP Classification —S406

WHAT?   Use AI/ML to:
- Analyze Each Request
- Each Request is broken down via Tokenization
- Upload each Request with its Tokens
- Use Proprietary AI platform to identify/evaluate Tokens HOW?   Rule-based models
- Regex (Regular Expression)

Deep Learning Transformer Based Models
- BERT (Pre-Trained)
- RoBERTa (Pre-Trained)
- LegalMation Domain (Fine-Tuned Custom Models)
- Word Embeddings(Word2Vec, Glove, Fine-Tuned Custom embeddings), Word Movers Distance(WMD)

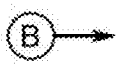

Feature Based Dimensions/Machine Learning
- Clustering, KNN, Agglomerative Clustering
- SVM, Logistic Regression
- Naive Bayes
- Decision Trees
- CRF, Bi-LSTM WHY?   Using a Ensemble Based Approach increases accuracy of the overall models

Request broken down by Tokens
   All | DOCUMENTS | regarding | customer | satisfaction | index | results | on | the | 2020 | Toyota | Tacoma | model | vehicles | from | 2020 | to | the | present.

Response:
   Subject | to | and | without | waiving | these | objections, Toyota | will | produce | relevant | documents | after | the | Court | executes | a | signed | protective | order | by | the | parties.

Evaluated and Analyzed via DLTBM/FBD (Deep Learning Transformer Based Model/Feature Based Dimensions) >XXXX dimensions of data

FIG. 3C

Client's Historical Data Warehouse — S408

WHAT? We then store and index:
- Each Request (Transformer-based Identification markers)
- Each Request is Paired with its Response
- Each Request is broken down via TOKENIZATION
- Upload each Request with its TOKENS
- Use Proprietary AI platform ensemble to identify, evaluate, and measure TOKEN features (Explainable AI)

HOW? Rule-based models
Regex 

Deep Learning Transformer Based Models
BERT (Pre-Trained)
RoBERTa (Pre-Trained)
LegalMation Domain (Fine-Tuned Custom Models)
Word Embeddings(Word2Vec, Glove, Fine-Tuned Custom embeddings), Word Movers Distance(WMD)

Feature Based Dimensions/Machine Learning
Clustering, KNN, Agglomerative Clustering
SVM, Logistic Regression
Naive Bayes
Decision Trees
CRF, Bi-LSTM

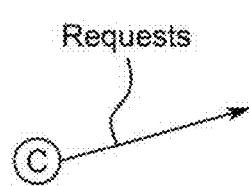

WHY? Using a Ensemble Based Approach increases accuracy of the overall models

Evaluated and Analyzed via DLTBM/FBD (Deep Learning Transformer Based Model/Feature Based Dimensions) >XXXX dimensions of data WHAT? We also store and index:
- Each Response (Tied to Request Transformer-based Identification markers)
- Each Similar Request type (confidence >X%) is clustered with their Responses
- Each Response is broken down via TOKENIZATION 
- Cluster of Similar Request and then Their Responses
- Use Proprietary AI platform ensemble to identify, evaluate, and measure TOKEN features (Explainable AI)
- Responses are then ranked by % frequency Responses Ⓓ

HOW? Deep Learning Transformer Based Models
- BERT
- RoBERTa
- LegalMation Domain Trained Models Feature Based Dimensions/Machine Learning Based Models
- Clustering
- SVM
- Naive Bayes
- Decision Trees
- Client Preferred Responses Decision Tree WHY? Using a Ensemble Based Approach increases accuracy of the overall models

| Explainable AI | | | |
|---|---|---|---|
| Process | | | |
| Negation Detector | Synonym/Similar Expressions | Entity-Relation Extraction | Motivation/Intent Analysis |
| Process | Process | Process | Process |

FIG. 3DB

User Experience

Input — S410

WHAT?  User Uploads New Set of Discovery Requests or other Document Type(s) (e.g., Subpoena, demand letter)

HOW?  Uploads VIA
- LegalMation UI/UX
- Web-based Drag and Drop Upload UI (2)

NOTE: Same Process in order to align text in the same manner to be consistent with matching AI/ML NLP Classification — S414

WHAT?  Use identical AI/ML process above to:
- Analyze Each Request
- Each Request is broken down via Tokenization
- Upload each Request with its Tokens
- Use Proprietary AI platform to identify/evaluate Tokens HOW?  Rule-based models
- Regex (Regular Expression)

Deep Learning Transformer Based Models
- BERT (Pre-Trained)
- RoBERTa (Pre-Trained)
- LegalMation Domain (Fine-Tuned Custom Models)
- Word Embeddings(Word2Vec, Glove, Fine-Tuned Custom embeddings), Word Movers Distance(WMD)

Feature Based Dimensions/Machine Learning
- Clustering, KNN, Agglomerative Clustering
- SVM, Logistic Regression
- Naive Bayes
- Decision Trees
- CRF, Bi-LSTM Request broken down by Tokens All | DOCUMENTS | regarding | customer | satisfaction | survey | results | on | the | 2020 | Toyota | Tacoma | model | vehicles | from | 2020 | to | the | present.

Evaluated and Analyzed via DLTBM/FBD
(Deep Learning Transformer Based Mode/Feature Based Dimensions)
>XXXX dimensions of data

FIG. 3H

| Request to Match | Feature Tags |
|---|---|
| Please produce any and all phototaping/videotaping and/or video surveillance of the aisle on the day of the INCIDENT occurred, and which was taken on the day of the INCIDENT. Said request shall include any and all photographs / videotapings and/or video surveillance of Plaintiffs), Defendant(s), Cross-Defendant(s), or portion thereof, taken by Defendant(s), Cross- Defendants), or any agent thereof. | [['communications', 'defendant', 'incident', 'incident scene', 'photo/video', 'plaintiff', 'surveillance']] |
| Please produce any and all phototaping/videotaping and/or video surveillance of the aisle on the day of the INCIDENT occurred, and which was taken on the day of the INCIDENT. Said request shall include any and all photographs / videotapings and/or video surveillance of Plaintiffs), Defendant(s), Cross-Defendant(s), or portion thereof, taken by Defendant(s), Cross- Defendants), or any agent thereof. Matches | ['communications', 'defendant', 'incident', 'incident scene', 'photo/video', 'plaintiff', 'surveillance'] |
| Please produce any and all photograph(s) of the aisle on which the INCIDENT occurred, and which was/were taken on the day of the INCIDENT. Said request shall include any and all photographs / videotapings and/or video surveillance of Plaintiff(s), Defendant(s), Cross- Defendant(s), or portion thereof, taken by Defendant(s), Cross- Defendant(s), or any agent thereof. | ['communications', 'defendant', 'incident', 'incident scene', 'photo/video', 'plaintiff', 'surveillance'] |

FIG. 5A

| | |
|---|---|
| Please produce any and all photograph(s)/videotaping and/or video surveillance of any and all parties or property involved in aforesaid INCIDENT. Said request shall include any and all photographs/ videotapings and/or video surveillance of Plaintiffs, Defendants, Cross- Defendant(s), or portion thereof, taken by Defendant(s), Cross-Defendant(s), or any agent thereof. | ['communications', 'defendant', 'incident', 'photo/video', 'plaintiff', 'premises', 'surveillance'] |
| Any and all photographs and video tapes relating to any place, object or individual which concerns the INCIDENT which are in YOUR possession, custody or control. This request should include color photos and all surveillance video available in the location where the INCIDENT occurred. | ['defendant', 'hazard', 'incident', 'incident scene', 'location', 'owners', 'persons', 'photo/video', 'surveillance'] |
| Any and all photographs and video tapes depicting any prior aisle sweeps, on the day of the INCIDENT, which are in YOUR possession, custody or control. | ['defendant', 'incident', 'incident scene', 'maintenance', 'owners', 'photo/video', 'surveillance'] |
| Produce a true and correct copy of any video surveillance tape depicting PLAINTIFF on the date of the INCIDENT. | ['incident', 'photo/video', 'plaintiff', 'surveillance'] |
| Produce a true and correct copy of ANY and ALL video surveillance tape depicting PLAINTIFF and PLAINTIFF'S ACCIDENT which is the subject of this lawsuit. | ['incident', 'injuries/damages', 'litigation', 'photo/video', 'plaintiff', 'surveillance'] |

FIG. 5B

| | |
|---|---|
| Please produce all videotapes or photographs obtained through surveillance of Plaintiff at any time. | ['photo/video', 'plaintiff', 'surveillance'] |
| Produce any and all DOCUMENT(S) in YOUR possession, custody, and control, and that refer to, relate to, make mention of, or constitute surveillance of Plaintiff Jane Doe, including but not limited to all video footage, pictures, and reports of any surveillance. | ['defendant', 'documents', 'owners', 'photo/video', 'plaintiff', 'reports', 'surveillance'] |
| Any and all DOCUMENTS of whatever nature consisting of photographs, pictures, videotapes, video recording, surveillance pictures, surveillance videotapes, or any other type of visual representation depicting the incident. | ['description', 'documents', 'incident', 'photo/video', 'surveillance'] |

FIG. 5C

| Ranked Response Type (RRT) | RRT Code | Response Content |
|---|---|---|
| N/A | 0 | Responding party objects to this request on the grounds that it is compound and overbroad. Responding Party objects to the extent that this request seeks documents protected by the attorney work-product doctrine. Nacht & Lewis Architects, Inc. v. Sup. Ct. (1996) Cal.App.4th 214; Soltani-Rastegar v. Sup. Ct. (1989) 208 Cal.App.3d 424,526 Cal Rpt. 255. Without waiving said objections, Responding Party will agree to comply with this request by producing non-privileged responsive documents in its possession, custody and control. |
| N/A | 0 | Responding party objects to this request on the grounds that it is overbroad. Responding Party objects to the extent that this request seeks documents protected by the attorney work- product doctrine. Nacht & Lewis Architects, Inc. v. Sup. Ct. (1996) Cal.App.4th 214; Soltani- Rastegar v. Sup. Ct. (1989) 208 Cal.App.3d 424,526 Cal Rpt. 255. Without waiving said objections, Responding Party will agree to comply with this request by producing non-privileged responsive documents in its possession, custody and control. |

FIG. 5D

| N/A | O | Responding party objects to this request on the grounds that it is compound and overbroad. Responding Party objects to the extent that this request seeks documents protected by the attorney work-product doctrine. Nacht & Lewis Architects, Inc. v. Sup. Ct. (1996) CalApp^ 214; Soltani-Rastegar v. Sup. Ct. (1989) 208 Cal.App.3d 424,526 Cal Rpt. 255. Without waiving said objections, Responding Party will agree to comply with this request by producing non-privileged responsive documents in its possession, custody and control. |
|---|---|---|
| N/A | O | Responding Party objects to this request in that it is overly broad and burdensome; the request seeks material that is irrelevant and not reasonably calculated to lead to admissible evidence. Further, Responding Party objects that this request seeks information that is privileged, proprietary, confidential, and/or trade secret. Responding Party objects as this request seeks documents protected by the attorney-client privilege and/or attorney work-product doctrine as it requests documents specifically created in anticipation of litigation by defendant and its agents. Nacht & Lewis Architects, Inc. v. Sup. Ct. (1996) CalApp.4th 214; Soltani-Rastegar v. Sup. Ct. (1989) 208 Cal.App.3d 424,526 Cal Rpt. 255. Without waiving said objections, Responding Party has conducted a diligent search and reasonable inquiry and will comply with this request by producing all responsive photos as Exhibit "C." Investigation and discovery are continuing. Accordingly, Responding Party reserves the right to supplement and/or amend its response up to and including time of trial. |

FIG. 5E

| will produce |
|---|
| Responding Party objects to this request in that it is overly broad and burdensome; the request seeks material that is irrelevant and not reasonably calculated to lead to admissible evidence. Further, Responding Party objects that this request seeks information that is privileged, proprietary, confidential, and/or trade secret. Responding Party objects as this request seeks documents protected by the attorney-client privilege and/or attorney work-product doctrine as it requests documents specifically created in anticipation of litigation by defendant and its agents. Nacht & Lewis Architects, Inc. v. Sup. Ct. (1996) Cal.App.4th 214; Soltani-Rastegar v. Sup. Ct. (1989) 208 Cal.App.3d 424,526 Cal Rpt. 255. Without waiving said objections, Responding Party has conducted a diligent search and reasonable inquiry and will comply with this request by producing all responsive surveillance footage as Exhibit "A". Moreover, Responding Party has conducted a diligent search and reasonable inquiry and will comply with this request by producing all non-privileged documents concerning inspection of the premises that were in place at the time of the incident if Plaintiff will willingly agree to sign a stipulated protective order providing that these documents will be used only for purposes related to this lawsuit. Assuming counsel agrees, please sign the enclosed proposed stipulated protective order and return to my attention for prompt filing with the Court. Upon receiving an executed stipulated protective order, Responding Party will produce its responsive Policies & Procedures. Investigation and discovery are continuing. Accordingly, Responding Party reserves the right to supplement and/or amend its response up to and including time of trial. |

FIG. 5F

| | | (K) ... (P) |
|---|---|---|
| not aware at this time | 0 | Responding Party objects on grounds that the request is compound. Responding Party objects as this request is overbroad, vague and ambiguous as phrased. Responding Party further objects to the extent that the request is overbroad, vague, ambiguous, and uncertain with regard to date, time, content, and scope. Responding Party also objects on grounds that the request seeks information in violation of the attorney-client privilege, work product doctrine, and information prepared in anticipation of litigation. Responding Party objects to this request to the extent that it seeks premature disclosure of expert witness information. Without waiving said objections, and subject to the same, Responding Party responds as follows: Responding Party is not aware at this time of any surveillance. Discovery in this matter is in its infancy and Responding Party is still investigating Plaintiffs allegations. No depositions have been taken and preliminary discovery responses have not been received from Plaintiff. Discovery and investigation are in the preliminary stages, and thus Responding Party reserves the right but assumes no obligation to supplement its response at a later date. |
| (n)ever existed | 0 | Defendant objects to this demand on the grounds that it is grossly overbroad and unduly burdensome, seeks documents and information protected by the attorney-client and work product privilege doctrines. Subject to and without waiving the foregoing objections, defendant does not have any documents responsive to this request, as such documents have never existed. |
| produced therein | 1 | Closed circuit television coverage (CCTV) and photographs of the subject Woolite bottle/incident area are produced herein. |

FIG. 5H

| Semantic Similarity | Feature Tag Similarity | Weighted Similarity | Ranked Order |
|---|---|---|---|
| 1 | 1.3228875656 | 1.3228875656 | 1 |
| 0.9612 | 1.3228875656 | 1.27154808 | 2 |
| 0.8048 | 1.1338893419 | 0.9125574244 | 3 |
| 0.6458 | 0.8856221722 | 0.571934508 | |
| 0.712 | 0.7850046273 | 0.558952946 | 4 |
| 0.6437 | 0.8610011748 | 0.554226825 | |
| 0.6554 | 0.7850046273 | 0.514519327 | 5 |
| 0.7233 | 0.685275378 | 0.495659681 | 6 |
| 0.6344 | 0.7559288946 | 0.479561323 | |
| 0.6381 | 0.614525 | 0.392128403 | |

FIG. 5I

| Request to Match | Feature Tags |
|---|---|
| All DOCUMENTS that reflect the policies and procedures in effect at the time of the INCIDENT for maintaining records of slip and fall accidents in the same area as this subject location, where people claim they were not injured. | [['documents', 'incident', 'incident scene', 'injuries/damages', 'litigation', 'location', 'maintenance', 'policies/procedures']] |
| Matches | |
| All DOCUMENTS that reflect the policies and procedures in effect at the time of the INCIDENT for maintaining records of slip and fall accidents in the same area as this subject location, where people claim they were not injured. | ['documents', 'incident', 'incident scene', 'injuries/damages', 'litigation', 'location', 'maintenance', 'policies/procedures'] |
| All DOCUMENTS that reflect the policies and procedures in effect at the time of the INCIDENT for maintaining records of slip and fall accidents in the same department as this subject location, where people claim they were not injured. | ['documents', 'incident', 'incident scene', 'injuries/damages', 'litigation', 'location', 'maintenance', 'policies/procedures'] |

FIG. 6A

| | |
|---|---|
| All DOCUMENTS that reflect the policies and procedures in effect at the time of the INCIDENT for maintaining records of slip and fall accidents in the area as this subject location, where people claim they were injured. | ['documents', 'incident', 'incident scene', 'injuries/damages', 'litigation', 'location', 'maintenance', 'policies/procedures'] |
| All DOCUMENTS that reflect the policies and procedures in effect at the time of the INCIDENT for maintaining records of slip and fall accidents in the same department as this subject location, where people claim they were injured. | ['documents', 'incident', 'incident scene', 'injuries/damages', 'litigation', 'location', 'maintenance', 'policies/procedures'] |
| All DOCUMENTS that reflect the policies and procedures in effect at the time of the INCIDENT for reporting slip and fall accidents at this subject location, where people claim they were not injured. | ['documents', 'incident', 'incident reports', 'injuries/damages', 'litigation', 'location', 'policies/procedures'] |
| All DOCUMENTS that reflect the policies and procedures in effect at the time of the INCIDENT for reporting slip and fall accidents in the same department as this INCIDENT, where people claim they were not injured. | ['documents', 'incident', 'incident reports', 'incident scene', 'injuries/damages', 'litigation', 'policies/procedures'] |

FIG. 6B

| All DOCUMENTS that reflect the number of slip and fall accidents at the same location of this INCIDENT, where people claimed they were not injured since this INCIDENT. | ['documents', 'incident', 'incident scene', 'injuries/damages', 'location'] |
| All DOCUMENTS that reflect the number of slip and fall accidents, at the same location of this INCIDENT, where people claimed they were injured in since this INCIDENT. | ['documents', 'incident', 'incident scene', 'injuries/damages', 'location'] |
| All DOCUMENTS that reflect the number of slip and fall accidents in the same area where plaintiff fell in this INCIDENT, where people claimed they were not injured in the after this INCIDENT. | ['documents', 'incident', 'incident scene', 'injuries/damages', 'plaintiff'] |
| All DOCUMENTS that reflect the number of slip and fall accidents in the same department where plaintiff fell in this INCIDENT, where people claimed they were not injured in the after this INCIDENT | ['documents', 'incident', 'incident scene', 'injuries/damages', 'plaintiff'] |

FIG. 6C

| Ranked Response Type (RRT) | RRT Code | Response Content |
|---|---|---|
| | | |
| Will produce | 1 | Upon receipt of a protective order executed by Plaintiff and endorsed by the court, Responding Party will produce all currently known, non-privileged documents in its possession, custody, or control, to the extent that such documents exist. Discovery and investigation are ongoing and Responding Party reserves the right but assumes no obligation to supplement this answer at a later date. |
| Will produce | 1 | Upon receipt of a protective order executed by Plaintiff and endorsed by the court, Responding Party will produce all currently known, non-privileged documents in its possession, custody, or control, to the extent that such documents exist. Discovery and investigation are ongoing and Responding Party reserves the right but assumes no obligation to supplement this answer at a later date. |

FIG. 6D

| Will produce | 1 | Upon receipt of a protective order executed by Plaintiff and endorsed by the court, Responding Party will produce all currently known, non-privileged documents in its possession, custody, or control, to the extent that such documents exist. Discovery and investigation are ongoing and Responding Party reserves the right but assumes no obligation to supplement this answer at a later date. |
|---|---|---|
| Will produce | 1 | Upon receipt of a protective order executed by Plaintiff and endorsed by the court, Responding Party will produce all currently known, non-privileged documents in its possession, custody, or control, to the extent that such documents exist. Discovery and investigation are ongoing and Responding Party reserves the right but assumes no obligation to supplement this answer at a later date. |
| Will produce | 1 | Upon receipt of a protective order executed by Plaintiff and endorsed by the court, Responding Party will produce all currently known, non-privileged documents in its possession, custody, or control, to the extent that such documents exist. Discovery and investigation are ongoing and Responding Party reserves the right but assumes no obligation to supplement this answer at a later date. |
| Will produce | 1 | Upon receipt of a protective order executed by Plaintiff and endorsed by the court, Responding Party will produce all currently known, non-privileged documents in its possession, custody, or control, to the extent that such documents exist. Discovery and investigation are ongoing and Responding Party reserves the right but assumes no obligation to supplement this answer at a later date. |

FIG. 6E

| Will produce | 1 | Responding Party objects that the terms "accidents" and "location" are vague, ambiguous, overbroad, not adequately defined and subject to multiple interpretations. Responding party further objects to the extent that the request seeks confidential and private information which is neither relevant nor reasonably calculated to lead to the discovery of admissible evidence. Upon receipt of a protective order executed by Plaintiff and endorsed by the court, Responding Party will produce its two (2) year claims run which it will produce upon the receipt of a fully executed protective order endorsed by the Court. |
|---|---|---|
| Will produce | 1 | Responding Party objects that the terms "accidents" and "location" are vague, ambiguous, overbroad, not adequately defined and subject to multiple interpretations. Responding party further objects to the extent that the request seeks confidential and private information which is neither relevant nor reasonably calculated to lead to the discovery of admissible evidence. Upon receipt of a protective order executed by Plaintiff and endorsed by the court, Responding Party will produce its two (2) year claims run which it will produce upon the receipt of a fully executed protective order endorsed by the Court. |

FIG. 6F

| Will produce | 1 | Responding Party objects that the terms "accidents" and "location" are vague, ambiguous, overbroad, not adequately defined and subject to multiple interpretations. Responding party further objects to the extent that the request seeks confidential and private information which is neither relevant nor reasonably calculated to lead to the discovery of admissible evidence. Upon receipt of a protective order executed by Plaintiff and endorsed by the court, Responding Party will produce its two (2) year claims run which it will produce upon the receipt of a fully executed protective order endorsed by the Court. |
| Will produce | 1 | Responding Party objects that the terms "accidents" and "location" are vague, ambiguous, overbroad, not adequately defined and subject to multiple interpretations. Responding party further objects to the extent that the request seeks confidential and private information which is neither relevant nor reasonably calculated to lead to the discovery of admissible evidence. Upon receipt of a protective order executed by Plaintiff and endorsed by the court, Responding Party will produce its two (2) year claims run which it will produce upon the receipt of a fully executed protective order endorsed by the Court. |

FIG. 6G

| Semantic Similarity | Feature Tag Similarity | Weighted Similarity | Ranked Order |
|---|---|---|---|
| 1 | 1.414213562 | 1.414213562 | 1 |
| 0.9761 | 1.414213562 | 1.380413858 | 2 |
| 0.879 | 1.414213562 | 1.243093721 | 3 |
| 0.873 | 1.414213562 | 1.23460844 | 4 |
| 0.9683 | 1.096054882 | 1.061309942 | 5 |
| 0.9441 | 1.096054882 | 1.034785414 | 6 |
| 0.8856 | 0.9872265245 | 0.874322101 | 7 |
| 0.7509 | 0.9872265245 | 0.741337473 | 8 |
| 0.8096 | 0.7898812196 | 0.639431954 | 9 |
| 0.7797 | 0.7898812196 | 0.615816569 | 10 |

FIG. 6H

| Request to Match | Feature Tags |
|---|---|
| Any and all sweeping records pertaining to Defendant's premises for two months prior to the date of the subject incident, specifically from September 24, 2017 to November 24, 2017. | ['defendant', 'documents', 'incident', 'maintenance', 'premises'] |
| Matches | |
| Any and all sweeping records pertaining to Defendant's premises for two months prior to the date of the subject incident, specifically from September 24, 2017 to November 24, 2017. | ['defendant', 'documents', 'incident', 'maintenance', 'premises'] |
| Any and all sweeping records pertaining to Defendant's premises for two months after the date of the subject incident, specifically from November 24, 2017 to January 24, 2017. | ['defendant', 'documents', 'incident', 'maintenance', 'premises'] |

FIG. 7A

| | |
|---|---|
| Any and all cleaning records pertaining to the subject premises for two months prior to the date of the subject incident, specifically from September 24, 2017 to November 24, 2017. | ['documents', 'incident', 'maintenance', 'premises'] |
| Any and all maintenance records pertaining to the subject premises for two months prior to the date of the subject incident, specifically from September 24, 2017 to November 24, 2017. | ['documents', 'incident', 'maintenance', 'premises'] |
| Any and all sweeping records pertaining to Defendant's premises for the date of the subject incident. | ['defendant', 'documents', 'incident', 'maintenance', 'premises'] |
| Any and all cleaning records pertaining to the subject premises for two months after the date of the subject incident, specifically from November 24, 2017 to January 24, 2017. | ['documents', 'incident', 'maintenance', 'premises'] |

FIG. 7B

| Request | Tags |
|---|---|
| Any and all maintenance records pertaining to the subject premises for two months after the date of the subject incident, specifically from November 24, 2017 to January 24, 2017. | ['documents', 'incident', 'maintenance', 'premises'] |
| All DOCUMENTS concerning Defendant's employee manuals and/or store maintenance manuals for two years prior to the INCIDENT to the date of the INCIDENT. | ['defendant', 'documents', 'employee', 'incident', 'maintenance', 'policies/procedures', 'premises'] |
| Any and all DOCUMENTS depicting records of inspections or sweep logs made by YOU OR ANYONE ACTING ON YOUR BEHALF, to the subject ACME location for a period of two (2) years prior to the INCIDENT to the present time. | ['business', 'defendant', 'documents', 'employee', 'incident', 'location', 'maintenance', 'persons'] |
| Any and all DOCUMENTS in any way relating to the condition of the AREA OF THE SUBJECT INCIDENT during the 24 hours prior to the SUBJECT INCIDENT and the 2 hours following the SUBJECT INCIDENT including, but not limited to, the nature of the flooring surface and a detailed description including nature, appearance and size of any substance on the flooring as well as applicable times for each substance. | ['description', 'documents', 'floor', 'hazard', 'incident', 'incident scene', 'schedules'] |

FIG. 7C

| Ranked Response Type (RRT) | RRT Code | Response Content |
|---|---|---|
| N/A | 0 | Defendant object to his request on the ground that it seeks confidential and proprietary information. Defendant further objects to this request on the ground that it seeks irrelevant information not reasonably calculated to lead to the discovery of admissible evidence. Defendant also objects to this request on the grounds that it is vague, ambiguous, overbroad and unduly burdensome. Investigation and discovery are continuing, and Defendant reserves the right to amend, modify and/or supplement this response. |
| N/A | 0 | Defendant object to his request on the ground that it seeks confidential and proprietary information. Defendant further objects to this request on the ground that it seeks irrelevant information not reasonably calculated to lead to the discovery of admissible evidence. Defendant also objects to this request on the grounds that it calls for inadmissible information regarding subsequent remedial measures. Defendant also objects to this request on the grounds that it is vague, ambiguous, overbroad and unduly burdensome. Investigation and discovery are continuing, and Defendant reserves the right to amend, modify and/or supplement this response. These responses are signed by counsel solely for the purpose of stating and preserving objections. |

FIG. 7D

| | | |
|---|---|---|
| N/A | 0 | Defendant object to his request on the ground that it seeks confidential and proprietary information. Defendant further objects to this request on the ground that it seeks irrelevant information not reasonably calculated to lead to the discovery of admissible evidence. Defendant also objects to this request on the grounds that it is vague, ambiguous, overbroad and unduly burdensome. Investigation and discovery are continuing, and Defendant reserves the right to amend, modify and/or supplement this response. |
| N/A | 0 | Defendant object to his request on the ground that it seeks confidential and proprietary information. Defendant further objects to this request on the ground that it seeks irrelevant information not reasonably calculated to lead to the discovery of admissible evidence. Defendant also objects to this request on the grounds that it is vague, ambiguous, overbroad and unduly burdensome. Investigation and discovery are continuing, and Defendant reserves the right to amend, modify and/or supplement this response. |
| No document | 0 | Defendant object to his request on the ground that it seeks confidential and proprietary information. Defendant further objects to this request on the ground that it seeks irrelevant information not reasonably calculated to lead to the discovery of admissible evidence. Defendant also objects to this request on the grounds that it is vague, ambiguous, overbroad and unduly burdensome. Subject to and without waving the foregoing objection, Defendant responds as follows: Defendant is not currently in possession of documents which are responsive to this request. In an effort to comply with this request, Defendant has conducted a diligent and reasonable search for the requested items. Investigation and discovery are continuing, and Defendant reserves the right to amend, modify and/or supplement this response. |

FIG. 7E

| N/A | 0 | Defendant object to his request on the ground that it seeks confidential and proprietary information. Defendant further objects to this request on the ground that it seeks irrelevant information not reasonably calculated to lead to the discovery of admissible evidence. Defendant also objects to this request on the grounds that it calls for inadmissible information regarding subsequent remedial measures. Defendant also objects to this request on the grounds that it is vague, ambiguous, overbroad and unduly burdensome. Investigation and discovery are continuing, and Defendant reserves the right to amend, modify and/or supplement this response. |
| N/A | 0 | Defendant object to his request on the ground that it seeks confidential and proprietary information. Defendant further objects to this request on the ground that it seeks irrelevant information not reasonably calculated to lead to the discovery of admissible evidence. Defendant also objects to this request on the grounds that it calls for inadmissible information regarding subsequent remedial measures. Defendant also objects to this request on the grounds that it is vague, ambiguous, overbroad and unduly burdensome. Investigation and discovery are continuing, and Defendant reserves the right to amend, modify and/or supplement this response. |

FIG. 7F

| N/A | 0 | The Responding Party objects to this request to the extent that it is overbroad, not reasonably particularized as required by the Code of Civil Procedure, and unduly burdensome. The Responding Party further objects to this request to the extent that it seeks documents protected by either the attorney-client privilege and/or attorney work product doctrine. The Responding Party also objects to this request to the extent that it seeks documents prepared by consultants or experts prior to time required for expert exchange. The Responding Party further objects to this request to the extent that it seeks any documents that are protected from disclosure by confidentiality, privacy rights or because it is a business or trade secret. Without waiving the aforementioned objections, the Responding Party agrees to comply with this request only after the Propounding Party agrees to a stipulated protective order and that protective order is signed by the Court. |
|---|---|---|
| (n)ever existed | 0 | Defendant has no documents responsive to this request, as such documents have never existed. |

FIG. 7G

| Will produce | 1 | Responding Party objects that the term "in any way relating to the condition" is overbroad, vague, and ambiguous. Responding Party objects that the term "AREA OF THE SUBJECT INCIDENT" is overbroad, vague, ambiguous, compound, and forces Responding Party to admit that Plaintiff fell. Responding Party objects that the term "SUBJECT INCIDENT" is compound, overbroad, vague, and ambiguous. Responding Party objects that this request is confusing and overbroad as drafted. Responding Party objects that this request seeks confidential information and information that is irrelevant and not reasonably calculated to lead to the discovery of admissible evidence. Code of Civil Procedure §2017.010. Responding Party objects to the extent this request seeks information in violation of attorney-client privilege and the attorney work-product doctrine and information prepared in anticipation of litigation. Natch & Lewis Architects, Inc. v. Superior Court, (1996) 54 Cal Rptr. 2d 575. Responding Party objects that this request is overbroad as to time and scope and not specified with reasonable particularity. Without waiving said objections and subject to the same, Responding Party responds as follows: Responding Party will produce surveillance video and photographs currently in its custody, control, or possession. Discovery is continuing and Responding Party reserves the right but assumes no obligation to supplement this response at a later date. |

FIG. 7H

| Semantic Similarity | Feature Tag Similarity | Weighted Similarity | Ranked Order |
|---|---|---|---|
| 1 | 1.118033989 | 1.118033989 | 1 |
| 0.8668 | 1.118033989 | 0.969111861 | 2 |
| 0.8596 | 0.94427191 | 0.811696134 | 3 |
| 0.8136 | 0.94427191 | 0.768259626 | 4 |
| 0.6318 | 1.118033989 | 0.706373874 | |
| 0.717 | 0.94427191 | 0.677042959 | 5 |
| 0.6755 | 0.94427191 | 0.637855675 | 6 |
| 0.6115 | 1.024208334 | 0.626303396 | |
| 0.6146 | 0.789812196 | 0.485418576 | |
| 0.6128 | 0.409683334 | 0.251053947 | |

FIG. 7I

| Request to Match | Feature Tags |
|---|---|
| All DOCUMENTS supporting YOUR contention, if any, that on the date of the INCIDENT but prior to the occurrence of the INCIDENT, YOU did not have actual or constructive notice of any liquid substance on the floor of the SCENE. | ['allegation', 'defendant', 'documents', 'floor', 'hazard', 'incident', 'incident scene', 'knowledge', 'no hazard', 'notice'] |
| Matches | |
| All DOCUMENTS supporting YOUR contention, if any, that on the date of the INCIDENT but prior to the occurrence of the INCIDENT, YOU did not have actual or constructive notice of any liquid substance on the floor of the SCENE. | ['allegation', 'defendant', 'documents', 'floor', 'hazard', 'incident', 'incident scene', 'knowledge', 'no hazard', 'notice'] |
| If you contend that Defendant, or someone on behalf of Defendant, did not have actual or constructive notice of the CONDITION OR SUBSTANCE on the floor prior to the INCIDENT, please produce all DOCUMENTS supporting that contention. | ['allegation', 'defendant', 'documents', 'floor', 'hazard', 'incident', 'incident scene', 'knowledge', 'no hazard', 'notice'] |

FIG. 8A

| A | D | E | F |
|---|---|---|---|
| If you contend that Defendant did not know of the CONDITION OR SUBSTANCE on the floor prior to the INCIDENT, produce all DOCUMENTS supporting that contention. Herein, "CONDITION OR SUBSTANCE" means the liquid that was on the floor in Defendant's store where the INCIDENT occurred on the date of the INCIDENT that Plaintiff slipped and fell on. | ['allegation', 'defendant', 'documents', 'floor', 'hazard', 'incident', 'incident scene', 'injuries/damages', 'plaintiff', 'premises'] | ['allegation', 'defendant', 'documents', 'hazard', 'incident', 'knowledge', 'lack of notice', 'notice', 'premises', 'safety'] | ['allegation', 'defendant', 'documents', 'incident', 'knowledge', 'notice'] |
| All DOCUMENTS that support YOUR contention that YOU had no notice of the dangerous condition at the SUBJECT PREMISES prior to the INCIDENT. | | | |
| All DOCUMENTS that support YOUR contention that YOU did not have notice of the INCIDENT. | | | |
| All DOCUMENTS reflecting, on the date of the INCIDENT, the presence of any liquid substance on the floor of the SCENE. | | | ['documents', 'floor', 'hazard', 'incident', 'incident scene'] |

| | |
|---|---|
| Produce any and all DOCUMENT(S) in YOUR possession, custody or control, and that relate to, refer to or make mention of the substance on the floor in the area where the INCIDENT occurred. | ['defendant', 'documents', 'floor', 'hazard', 'incident', 'incident scene', 'owners'] — F |
| Please produce any and all DOCUMENTS that refer, relate to or evidence, how or when the floor in the area Plaintiff fell became wet prior to the INCIDENT. | ['documents', 'evidence', 'floor', 'hazard', 'incident', 'incident scene', 'injuries/damages', 'plaintiff'] — G |
| All DOCUMENTS concerning the source of the condition or substance on the floor at the time of the INCIDENT. | ['documents', 'floor', 'hazard', 'incident', 'incident scene'] — H |
| All DOCUMENTS that support YOUR contention that the condition at the SUBJECT PREMISES was not open and obvious on the date of the INCIDENT. | ['allegation', 'defendant', 'documents', 'incident', 'premises'] |

FIG. 8C

| Ranked Response Type (RRT) | RRT Code | Response Content |
|---|---|---|
| Attached hereto | 1 | Objection. This request seeks information which is protected by the attorney-client privilege and/or the attorney work product doctrine, calls for legal conclusions, calls for an expert opinion, and assumes facts which have not been established or are otherwise not in evidence. Subject to and without waiving the foregoing objections, Defendant responds as follows: Defendant will produce the CCTV video of the incident, attached hereto and marked as Exhibit "A". Defendant will produce three (3) color photographs taken on the day of the incident, attached hereto and collectively marked as Exhibit "B". Defendant will produce the Customer Incident Report, attached hereto and marked as Exhibit "C". Defendant will produce a Witness Statement prepared by Jane Doe, attached hereto and marked as Exhibit "D". Defendant will produce various correspondence, attached hereto and collectively marked as Exhibit "E". Defendant will produce a ACME Claim Form, attached hereto and marked as Exhibit "F". Investigation and discovery are continuing, and Defendant reserves the right to amend, modify and/or supplement this response. |

FIG. 8D

| | | |
|---|---|---|
| No*document | O | The Responding Party objects to this request to the extent that it is not reasonably particularized as required by the Code of Civil Procedure, and unduly burdensome. The Responding Party further objects to this request as overbroad as it is not reasonably limited in time and scope. The Responding Party further objects to this request to the extent that it seeks documents protected by either the attorney-client privilege and/or attorney work product doctrine. The Responding Party also objects to this request to the extent that it seeks documents prepared by consultants or experts prior to time required for expert exchange. The Responding Party further objects to this request to the extent that it seeks any documents that are protected from disclosure by confidentiality, privacy rights or because it is a business or trade secret. Without waiving the aforementioned objections, Responding Party responds as follows: See exhibits A-G. |
| Unable to comply | O | Responding Party objects to this request to the extent that it is unduly burdensome, and not reasonably particularized as required by the Code of Civil Procedure. Responding Party objects to this request to the extent that it is overbroad as it is not reasonably limited in time and scope. Responding Party objects to this request to the extent that it is vague and ambiguous as to the term "inspections". Responding Party further objects on the grounds that this request is premature as discovery is in its infancy. Without waiving the aforementioned objections, Responding Party is unable to comply after a diligent search and reasonable inquiry as responsive documents do not exist. |

FIG. 8E

| | | |
|---|---|---|
| Unable to comply | O | Defendant objects to this request as vague and ambiguous as to the term "INCIDENT" and overbroad as to time, scope and location. Defendant further objects to the extent this request is unduly burdensome and seeks information that is irrelevant to the subject matter at issue and is not reasonably calculated to lead to the discovery of admissible evidence. Defendant objects to the extent this request seeks information in violation of the attorney-client privilege, the attorney work-product doctrine, and confidential work-product made in anticipation of litigation. Defendant objects that this request prematurely seeks expert opinion and legal conclusions. Upon diligent search and reasonable inquiry, Responding Party is unable to comply with this request. Responding Party has no non-privileged documents in its possession, custody, or control responsive to this request. Discovery and investigation are ongoing and Responding Party reserves the right but assumes no obligation to supplement this answer at a later date. |
| N/A | O | The Responding Party objects to this request to the extent that it is overbroad, not reasonably particularized as required by the Code of Civil Procedure, and unduly burdensome. The Responding Party further objects to this request to the extent that it seeks documents protected by either the attorney-client privilege and/or attorney work product doctrine. The Responding Party also objects to this request to the extent that it seeks documents prepared by consultants or experts prior to time required for expert exchange. The Responding Party further objects to this request to the extent that it seeks any documents that are protected from disclosure by confidentiality or privacy rights. Without waiving the aforementioned objections, the Responding Party agrees to comply with this request by producing all non-privileged responsive documents in its possession, custody and control. |

FIG. 8F

| Attached hereto | 1 | Objection. This request is vague, ambiguous, and overbroad. Subject to and without waiving the foregoing objections, Defendant responds as follows: Defendant will produce the CCTV video of the incident, attached hereto and marked as Exhibit "A". Defendant will produce three (3) color photographs taken on the day of the incident, attached hereto and collectively marked as Exhibit "B". Investigation and discovery are continuing, and Defendant reserves the right to amend, modify and/or supplement this response. |
| Attached hereto | 1 | Defendant objects to this demand on the grounds that it is grossly overbroad and unduly burdensome, seeks documents and information protected by the attorney-client and work product privilege doctrines. Subject to and without waiving the foregoing objections, attached hereto and Bates-stamped XX 0001-0011 and XX 0224, please find all non-privileged documents responsive to this request. |

FIG. 8G

| | |
|---|---|
| Will produce | 1 | Objection. This request is premature, is vague, ambiguous, and overbroad, assumes facts not in evidence, and seeks information which is protected by the attorney-client privilege and/or the attorney work product doctrine. The request seeks information protected by Code of Civil Procedure section 2034.010, et seq. The time for designating experts has not yet come. Any experts consulted to date are for purposes of consultation only. To date, Defendant has not had the opportunity to complete the necessary investigation and discovery including, but not limited to, interviewing potential witnesses, obtaining relevant documentation and other evidence, obtaining all of Plaintiff's records, and taking necessary depositions, including Plaintiff's deposition. Subject to and without waiving the foregoing objections, Defendant responds as follows: Defendant will produce three (3) color photographs, attached hereto and marked as Exhibit "A". Defendant will produce a CD containing the CCTV video, attached hereto and marked as Exhibit "B". Defendant will produce documents responsive to this request, attached hereto and marked as Exhibit "C". Defendant will produce a claim form, attached hereto and marked as Exhibit "D". Defendant will produce the report, attached hereto and marked as Exhibit "E". Defendant will produce the Witness Statement of Jane Smith attached hereto and marked as Exhibit "F". Defendant will produce the Witness Statement of Lucy Anderson attached hereto and marked as Exhibit "G". Defendant will produce the Witness Statement of Sally Jones attached hereto and marked as Exhibit "H". Defendant will produce the Witness Statement of Ann Bates attached hereto and marked as Exhibit "I". Investigation and discovery are continuing, and Defendant reserves the right to amend, modify and/or supplement this response. |

FIG. 8H

| | | |
|---|---|---|
| No document | O | The Responding Party objects to this request to the extent that it is not reasonably particularized as required by the Code of Civil Procedure, and unduly burdensome. The Responding Party further objects to this request as overbroad as it is not reasonably limited in time and scope. The Responding Party further objects to this request to the extent that it seeks documents protected by either the attorney-client privilege and/or attorney work product doctrine. The Responding Party also objects to this request to the extent that it seeks documents prepared by consultants or experts prior to time required for expert exchange. The Responding Party further objects to this request to the extent that it seeks any documents that are protected from disclosure by confidentiality, privacy rights or because it is a business or trade secret. Without waiving the aforementioned objections, Responding Party responds as follows: See exhibits A-G. These responses are signed by counsel solely for the purpose of stating and preserving objections. |
| Unable to comply | O | Defendant objects to this request as vague and ambiguous as to the term "INCIDEDNT" and overbroad as to time, scope and location. Defendant further objects to the extent this request is unduly burdensome and seeks information that is irrelevant to the subject matter at issue and is not reasonably calculated to lead to the discovery of admissible evidence. Defendant objects to the extent this request seeks information in violation of the attorney-client privilege, the attorney work-product doctrine, and confidential work-product made in anticipation of litigation. Defendant objects that this request prematurely seeks expert opinion and legal conclusions. Upon diligent search and reasonable inquiry, Responding Party is unable to comply with this request. Responding Party has no non-privileged documents in its possession, custody, or control responsive to this request. Discovery and investigation are ongoing and Responding Party reserves the right but assumes no obligation to supplement this answer at a later date. |

FIG. 81

| Semantic Similarity | Feature Tag Similarity | Weighted Similarity | Ranked Order |
|---|---|---|---|
| 1 | 1.581138883 | 1.581138883 | 1 |
| 0.6736 | 1.581138883 | 1.065055116 | 2 |
| 0.694 | 1.106797181 | 0.768117244 | 3 |
| 0.6875 | 1.106797181 | 0.760923062 | 4 |
| 0.6561 | 1.069181876 | 0.701490229 | 5 |
| 0.7285 | 0.9262209683 | 0.674743754 | 6 |
| 0.5936 | 1.033052698 | 0.613220082 | |
| 0.7004 | 0.8346626339 | 0.584572288 | 7 |
| 0.6111 | 0.9262209683 | 0.566006737 | |
| 0.6437 | 0.7409967746 | 0.476960938 | |

FIG. 8J

| Request to Match | Feature Tags |
|---|---|
| All photographs and videos that have been taken of Plaintiff between the date of the INCIDENT to the present. | [['incident', 'photo/video', 'plaintiff']] |
| Matches | |
| All photographs and videos that have been taken of Plaintiff between the date of the INCIDENT to the present. | ['incident', 'photo/video', 'plaintiff'] |
| All photographs and/or videotape depicting Plaintiff on the day of INCIDENT. | ['incident', 'photo/video', 'plaintiff'] |
| Copies of any photographs, video tape or drawings of Plaintiff taken at any time, including the INCIDENT, since the date of the SUBJECT INCIDENT. | ['diagrams', 'incident', 'photo/video', 'plaintiff'] |
| All DOCUMENTS, including without limitation investigative reports, surveillance tapes, CONCERNING Plaintiff at any time since the INCIDENT | ['documents', 'incident', 'investigation', 'photo/video', 'plaintiff', 'reports', 'surveillance'] |

FIG. 9A

| | |
|---|---|
| All photographs taken of Plaintiff at any time. | ['photo/video', 'plaintiff'] |
| ALL photographs and video footage depicting PLAINTIFF. | ['photo/video', 'plaintiff'] |
| All photographs, films and/or videotapes depicting plaintiff. | ['photo/video', 'plaintiff'] |
| All DOCUMENTS RELATING TO Plaintiff from the date of the INCIDENT to the present. | ['documents', 'incident', 'plaintiff'] |
| Any and all photographs of the Plaintiff. | ['photo/video', 'plaintiff'] |
| All DOCUMENTS depicting any parties involved in the INCIDENT, from anytime on the date of the INCIDENT, including photographs and videos. | ['documents', 'incident', 'photo/video'] |

FIG. 9B

| Ranked Response Type (RRT) | RRT Code | Response Content |
|---|---|---|
| Produced herein | 1 | Objection. This request is vague, ambiguous and overbroad in time and scope. Subject to, and without waiving the foregoing objections, Defendant responds as follows: CCTV coverage, which captures Plaintiff, is produced herein. Defendant is not in possession of photographs of Plaintiff. Investigation and discovery are continuing, and Defendant reserves the right to amend, modify and/or supplement this response. |
| N/A | 0 | The Responding Party objects to this request to the extent that it is overbroad, not reasonably particularized as required by the Code of Civil Procedure, and unduly burdensome. The Responding Party further objects to this request to the extent that it seeks documents protected by either the attorney-client privilege and/or attorney work product doctrine. The Responding Party also objects to this request to the extent that it seeks documents prepared by consultants or experts prior to time required for expert exchange. The Responding Party further objects to this request to the extent that it seeks any documents that are protected from disclosure by confidentiality or privacy rights. Without waiving the aforementioned objections, the Responding Party agrees to comply with this request by producing all non-privileged, responsive documents in its possession, custody and control. |

FIG. 9C

| | |
|---|---|
| Attached hereto | 1 |
| | Attached hereto and Bates-stamped XX 0011- 0019 and 0316- 0317, please find all documents responsive to this request. |
| Unable to comply | 0 |
| | Responding party objects to this request on the grounds that it is overbroad as to time and scope, vague and ambiguous, and, therefore, not reasonably calculated to lead to the discovery of admissible evidence. Responding party objects to this request to the extent that this request seeks documents protected by the attorney-client privilege and/or attorney work-product doctrine. Nacht & Lewis Architects, Inc. v. Sup. Ct. (1996) Cal.App.4th 214; Soltani-Rastegar v. Sup. Ct. (1989) 208 Cal.App.3d 424,526 Cal Rpt. 255. Without waiving said objections, Responding Party after a diligent search and reasonable inquiry is unable to comply with this request because no responsive documents are believed to exist. |
| Unable to comply | 0 |
| | The Responding Party objects to this request to the extent that it is overbroad, not reasonably particularized as required by the Code of Civil Procedure, and unduly burdensome. The Responding Party further objects to this request to the extent that it seeks documents protected by either the attorney-client privilege and/or attorney work product doctrine. The Responding Party also objects to this request to the extent that it seeks documents prepared by consultants or experts prior to time required for expert exchange. The Responding Party further objects to this request to the extent that it seeks any documents that are protected from disclosure by confidentiality, privacy rights or because it is a business or trade secret. Without waiving the aforementioned objections, Responding Party is unable to comply after a diligent search and reasonable inquiry as responsive documents do not exist. |

FIG. 9D

| | | |
|---|---|---|
| Attached hereto | 1 | Attached hereto and Bates-stamped XX Oil - 015 and 034, please find photos and video surveillance responsive to this request. |
| Attached hereto | 1 | Attached hereto and Bates-stamped XX 0007 - 0021, please find photographs responsive to this request. Defendant will produce video of the subject incident once that it becomes available to defendant's counsel. |
| produced herein | 1 | Objection. This request is vague, ambiguous and grossly overbroad in time and scope. This request also seeks information which is protected by the attorney-client privilege and/or work product doctrine pursuant to Nacht & Lewis Architects, Inc. v. Superior Court (1996) 47 Cal.App.4th 214, and Soltani-Rastegar v. Sup. Ct. (1989) 208 Cal.App.3d 424. Subject to, and without waiving the foregoing objection, Defendant responds as follows: Witness statements, CCTV coverage, and photographs of the are produced herein. Investigation and discovery are continuing, and Defendant reserves the right to amend, modify and/or supplement this response. |

FIG. 9E

| | |
|---|---|
| N/A | Defendant objects on the grounds that it seeks information and documents protected by the attorney-client and work product privilege doctrines, including documents prepared in anticipation of litigation by claims management. Defendant does not have any photographs of plaintiff from the day of the incident. | 0 |
| Attached hereto | Objection. This request is vague, ambiguous and overbroad, calls for speculation and seeks documents which are irrelevant to this action and is not reasonably calculated to lead to the discovery of admissible evidence. Subject to and without waiving the foregoing objections, Defendant responds as follows: Defendant will produce the CCTV video of the incident, attached hereto and marked as Exhibit "A". Defendant will produce three (3) color photographs taken on the day of the incident, attached hereto and collectively marked as Exhibit "B". Investigation and discovery are continuing, and Defendant reserves the right to amend, modify and/or supplement this response. | 1 |

FIG. 9F

| Semantic Similarity | Feature Tag Similarity | Weighted Similarity | Ranked Order |
|---|---|---|---|
| 1 | 0.8660254404 | 0.8660254404 | 1 |
| 0.8564 | 0.8660254404 | 0.7416664156 | 2 |
| 0.8236 | 0.8038847577 | 0.6620048865 | 3 |
| 0.7924 | 0.6852753778 | 0.5430122209 | 4 |
| 0.8143 | 0.6355674449 | 0.5176297638 | 5 |
| 0.814 | 0.6355674449 | 0.5174390035 | 6 |
| 0.7735 | 0.6355674449 | 0.4916942418 | 7 |
| 0.8306 | 0.5773500269 | 0.4795471134 | 8 |
| 0.751 | 0.6355674449 | 0.4773915420 | 9 |
| 0.7603 | 0.5773500269 | 0.4389594100 | 10 |

FIG. 9G

| Request to Match | Feature Tags |
|---|---|
| ALL policies of insurance which may provide coverage for the damages alleged in PLAINTIFF's Complaint herein. | [['injuries/damages', 'insurance', 'plaintiff', 'policies/procedures']] |
| Matches | |
| ALL policies of insurance which may provide coverage for the damages alleged in PLAINTIFF's Complaint herein. | ['injuries/damages', 'insurance', 'plaintiff', 'policies/procedures'] |
| The complete contents of all policies of liability insurance under which you are or may be insured for any claim, cause of action, or item of damages alleged by Plaintiff in this action. | ['defendant', 'injuries/damages', 'insurance', 'litigation', 'plaintiff', 'policies/procedures'] |

FIG. 10A

| A | D |
|---|---|
| A certified copy of all declaration pages and the entire insurance policies carried by YOU which may extend coverage to Plaintiff for claimed injuries from the INCIDENT. | ['declaration/affidavit', 'defendant', 'incident', 'injuries/damages', 'insurance', 'plaintiff', 'policies/procedures'] |
| All DOCUMENTS concerning any and all insurance policies, declaration pages, or amendments thereto of any policy of insurance affording Defendant coverage for the damages claimed by Plaintiff in this action. | ['declaration/affidavit', 'defendant', 'documents', 'injuries/damages', 'insurance', 'litigation', 'plaintiff', 'policies/procedures'] |
| A copy of the policy of insurance, including the insurance declaration page, through which these defendants were or might have been insured in any manner (for example, primary, pro-rata or excess liability coverage) for the damage or claims that may arise out of this action. | ['declaration/affidavit', 'defendant', 'injuries/damages', 'insurance', 'litigation', 'policies/procedures'] |
| Copies of ANY and ALL policies of liability, comprehensive, property damage or any other insurance policies providing coverage of any type for the INCIDENT complained of and providing coverage to any party in this action, including all riders, amendments, modifications, and renewals. | ['alteration', 'incident', 'injuries/damages', 'insurance', 'litigation', 'policies/procedures', 'premises'] |

| B | | F | |
|---|---|---|---|
| Copies of any and all policies of liability, comprehensive, property damage or any other insurance policies providing coverage of any type for the incident complained of and providing coverage to any party in this action, including all riders, amendments, modifications, and renewals. | ['alteration', 'incident', 'injuries/damages', 'insurance', 'litigation', 'policies/procedures', 'premises'] | | |
| A copy of each insurance liability policy providing or purporting to provide any liability insurance coverage for any defendant in connection with the INCIDENT, including excess or umbrella insurance policies. | ['defendant', 'incident', 'insurance', 'policies/procedures', 'relationship'] | | |
| All DOCUMENTS CONCERNING Defendant's insurance coverages in effect at the time of the INCIDENT, including without limitation, Defendant's declaration page and entire insurance policy. This Request includes without limitation, homeowner's insurance policies, commercial general liability policies, and excess liability policies. | ['advertisement', 'declaration/affidavit', 'defendant', 'documents', 'incident', 'insurance', 'policies/procedures'] | | |
| All DOCUMENTS RELATING TO or evidencing any applicable insurance coverage that may cover the losses claimed in this lawsuit. | ['documents', 'insurance', 'litigation'] | | |

FIG. 10C

| Ranked Response Type (RRT) | RRT Code | | | Response Content |
|---|---|---|---|---|
| Self-insured | 4 | | | Defendant is self-insured for this incident. |
| Please see | 1 | | | Responding Party objects that the term "you" is overbroad, vague, ambiguous, and compound. Responding Party objects that this request seeks information in violation of the attorney-client privilege and attorney work-product doctrine. Responding Party objects that this request seeks information prepared in anticipation of litigation. Responding Party objects that this request seeks information that is confidential, irrelevant and not reasonably calculated to lead to the discovery of admissible evidence. Responding Party objects that this request seeks information in violation of Responding Party and others' rights to privacy and financial privacy. Without waiving said objections and subject to the same, Responding Party responds as follows: Please see response to Form Interrogatory 4.1. |

FIG. 10D

| Attached hereto | 1 | Objection. This request is neither relevant nor reasonably calculated to lead to the discovery of admissible evidence, and violates Code of Civil Procedure section 2017.210, which restricts the nature and scope of discovery regarding insurance coverage and policies. Subject to and without waiving the foregoing objections, Defendant responds as follows: Defendant will produce the declarations page of the insurance policy in effect at the time of the incident, attached hereto and marked as Exhibit "I". |
|---|---|---|
| Attached hereto | 1 | Responding Party objects to this request to the extent that it is overbroad, unduly burdensome, and not reasonably particularized as required by the Code of Civil Procedure. Responding Party further objects to this request to the extent that it seeks documents protected by either the attorney-client privilege and/or attorney work product doctrine. Responding Party further objects to this request to the extent that it seeks documents prepared by consultants or experts prior to time required for expert exchange. Responding Party further objects to this request to the extent that it seeks any documents that are protected from disclosure by confidentiality or privacy rights. Without waiving the aforementioned objections, the Responding Party agrees to comply with this request by producing all non-privileged, responsive documents in its possession, custody and control. Attached hereto as Exhibit "A" is the applicable insurance declaration page. |

FIG. 10E

| | | |
|---|---|---|
| Attached hereto | 1 | Objection. Defendant objects to this request on the grounds that it is overbroad, unduly burdensome, and lacks foundation. Defendant also objects to this request on the grounds that it seeks the production of documents which are neither relevant to this action nor reasonably calculated to lead to the discovery of admissible evidence. Defendant further objects to this request on the grounds that it violates Code of Civil Procedure section 2017.210, which restricts the nature and scope of discovery regarding insurance coverage and policies. Subject to and without waiving the foregoing objections, Defendant responds as follows: Defendant directs Plaintiff to Defendant's Response to Form Interrogatory Nos. 4.1 and 4.2; additionally, Defendant will produce the insurance declaration sheet reflecting primary insurance coverage which is subject to a self-insured retention in the amount of $XXX, attached hereto as Exhibit "E". Investigation and discovery are continuing, and Defendant reserves the right to amend, modify and/or supplement this response. |
| Self-insured | 4 | Responding Party objects to this request in that it is compound, vague, ambiguous, and not reasonably calculated to lead to admissible evidence. Further, Responding Party objects that this request seeks information that is privileged, proprietary, confidential, and/or trade secret. Without waiving said objections, Responding Party responds as follows: Responding party will produce a declaration sheet reflecting primary insurance coverage which is subject to a self-insured retention in the amount of $XXX. |

FIG. 10F

| | | |
|---|---|---|
| N/A | 0 | Defendant objects on the ground that it violates Code of Civil Procedure section 2017, which restricts the nature and scope of discovery regarding insurance coverage and policies. Without waiving said objections, Responding Party has conducted a diligent search and reasonable inquiry and will comply with this request by producing the declaration page upon receipt of same. |
| Attached hereto | 1 | Objection. This request lacks foundation and assumes facts which have not been established or are otherwise not in evidence; This request is compound; This request calls for an expert opinion; This request is overbroad, oppressive and unreasonably burdensome; This request calls for speculation; This request is unlimited as to scope; This request is vague, and ambiguous; This request violates Code of Civil Procedure section 2017, et seq., which restricts the nature and scope of discovery regarding insurance coverage and policies; This request violates the right to privacy and confidentiality. Subject to and without waiving the foregoing objections, Defendant responds as follows: Defendant will produce the insurance declaration page, attached hereto and marked as Exhibit "G". Investigation and discovery are continuing, and Defendant reserves the right to amend, modify, and/or supplement this response. |

FIG. 10G

| | | |
|---|---|---|
| Self-insured | 4 | Responding party objects to this request on the grounds that it is overbroad in scope. Responding Party objects to this request in that it seeks information that is privileged, proprietary, confidential, and/or trade secret. Responding Party objects to the extent that this request seeks documents protected by the attorney-client privilege and/or attorney work-product doctrine. Nacht & Lewis Architects, Inc. v. Sup. Ct. (1996) Cal.App.4th 214; Soltani-Rastegar v. Sup. Ct. (1989) 208 Cal.App.3d 424,526 Cal Rpt. 255. Without waiving said objections, Responding Party responds as follows: Responding party will produce a declaration sheet reflecting primary insurance coverage which is subject to a self-insured retention in the amount of $XXX. |
| Self-insured | 4 | Objection. This response is neither relevant nor reasonably calculated to lead to the discovery of admissible evidence, and it violates Code of Civil Procedure section 2017, which restricts the nature and scope of discovery regarding insurance coverage and policies. Subject to and without waiving the foregoing objection, Defendant responds as follows: Defendant utilizes a combination of insurance, self-insured retentions, and self-insurance. With respect to claims arising out of third-party liabilities for bodily injury and property damage, Defendant elects to self-insure the insurance requirements of its agreements where allowed by law and by the terms of the agreement. Defendant's primary insurance coverage is subject to a self-insured retention in the amount of $XXX. Defendant is self-insured to an amount sufficient to cover the damages alleged in this claim. Applicable declarations page is produced herein. Investigation and discovery are continuing. |

FIG. 10H

SYSTEM, APPARATUS, NON-TRANSITORY COMPUTER-READABLE MEDIUM, AND METHOD FOR AUTOMATICALLY GENERATING RESPONSES TO REQUESTS FOR INFORMATION USING ARTIFICIAL INTELLIGENCE

CROSS-REFERENCE TO RELATED APPLICATION

This application is related to provisional application Ser. No. 63/238,582 filed on Aug. 30, 2021, the entire contents of which is incorporated by reference herein.

BACKGROUND

Technical Field

The present disclosure relates to information processing devices, systems, and methods, and more specifically to a system, apparatus, non-transitory computer-readable medium, and method for automatically generating responses to requests for information (for example, in a non-limiting embodiment, generating responses to requests for production regarding discovery in a legal matter) using artificial intelligence and machine learning ("AI/ML") techniques. Current methods for producing responses to legal documents are based on: (1) using templates or (2) locating and obtaining samples of prior responses and then cutting, copying, and pasting those responses or (3) creating document responses from scratch or (4) a combination of any of these or other approaches. This has several drawbacks as the wrong template or exemplar samples could be used for a particular situation, the template or exemplar samples could become outdated without the user knowing, there can be inconsistency among attorneys and staff as there is a lack of uniformity across an organization such as a law firm by people using different templates or exemplar samples. As the user must make modifications to language in the template or exemplar samples to adapt it to the current matter, errors can easily be introduced. Also, as the user is manually changing the template or exemplar samples, it is a time intensive and tedious endeavor. Further, this process several different programs and windows are open at the same time to toggle between the current document being produced, samples of previously existing documents and templates, and other resources needed to complete the document such as webpages or document management systems containing other resource materials. consumes a large amount of computer memory resources and other computer resources as

SUMMARY

According to an aspect of the present disclosure, a new information processing device, system, and method is described that includes automatically generating and/or suggesting responses to requests for information (for example, in a non-limiting embodiment, generating responses to requests for production regarding discovery in a legal matter) using artificial intelligence and machine learning ("AI/ML") techniques. The automatically generated or suggested responses (whether an objection or request for information or answer) are displayed in a user interface and can be edited using a text editor.

A document response production method executing on a computing device including processing circuitry, a display screen, and a non-transitory computer-readable medium storing executable instructions which when executed by the processing circuitry perform the method. The method includes: receiving, as input, a document with a plurality of requests for information, wherein each request for information is a text string; displaying, by the processing circuitry, a user interface on the display screen, the user interface simultaneously displaying a document viewer area, a virtual assistant area, and a text editor area; displaying the received document in the document viewer area; receiving, as input, a selected request for information from among the plurality of requests for information; displaying, in the virtual assistant area, one or more automatically selected recommended responses to the selected request for information, and displaying, in the virtual assistant area, one or more other selectable potential responses; based on the selected request for information, automatically generating a text string response to the selected request for information; and displaying the text string response in the text editor area, wherein the text string response is modifiable by user input.

A non-transitory computer-readable storage medium storing thereon executable instructions which when executed by processing circuitry causes the processing circuitry to perform a document response production method. The document response production method including: receiving, as input, a document with a plurality of requests for information, wherein each request for information is a text string; displaying a user interface on a display screen, the user interface simultaneously displaying a document viewer area, a virtual assistant area, and a text editor area; displaying the received document in the document viewer area; wherein the AI/ML engine has been trained by analyzing a plurality of historical documents with requests for information and corresponding response objections to those requests, receiving, as input, a selected request for information from among the plurality of requests for information; displaying, in the virtual assistant area, one or more automatically selected recommended responses to the selected request for information, and displaying, in the virtual assistant area, one or more other selectable potential responses; based on the selected request for information, automatically generating a text string response to the selected request for information; and displaying the text string response in the text editor area, wherein the text string response is modifiable by user input.

A document response production method, the method including: receiving, as input, a document with a plurality of requests for information, wherein each request for information is a text string; performing data preparation on the document; processing the document with the performed data preparation with an AI and ML engine by breaking down a request for information of the plurality of requests for information into tokens in which each token is a word, wherein the AI and ML engine has been trained by analyzing a plurality of historical documents with requests for information and corresponding response documents with responses to the requests for information; analyzing, by the AI and ML engine, the request for information from the document by applying both a semantic Deep Learning Transformer Based Model and at least one Feature-Based Dimension Machine Learning model; generating a composite similarity score for similarity of the request for information from the document to a request for information in the plurality of historical documents based on the analyzing; and producing a suggested response or responses to the request for information based on a ranked order of similarity scores.

A non-transitory computer-readable storage medium storing thereon executable instructions which when executed by processing circuitry causes the processing circuitry to perform a document response production method. The document response production method including: receiving, as input, a document with a plurality of requests for information, wherein each request for information is a text string; performing data preparation on the document; processing the document with the performed data preparation with an AI and ML engine by breaking down a request for information of the plurality of requests for information into tokens in which each token is a word, wherein the AI and ML engine has been trained by analyzing a plurality of historical documents with requests for information and corresponding response documents with responses to the requests for information; analyzing, by the AI and ML engine, the request for information from the document by applying both a semantic Deep Learning Transformer Based Model and at least one Feature-Based Dimension Machine Learning model; generating a composite similarity score for similarity of the request for information from the document to a request for information in the plurality of historical documents based on the analyzing; and producing a suggested response or responses to the request for information based on a ranked order of similarity scores.

A system for performing production of a response document, including: processing circuitry; and a non-transitory computer-readable storage medium storing thereon executable instructions which when executed by the processing circuitry causes the processing circuitry to: receive, as input, a document with a plurality of requests for information or user initiated data query, wherein each request for information is a text string; perform data preparation on the document; process the document with the performed data preparation with an AI and ML engine by breaking down a request for information of the plurality of requests for information into tokens in which each token is a word, wherein the AI and ML engine has been trained by analyzing a plurality of historical documents with requests for information and corresponding response documents with responses to the requests for information; analyze, by the AI and ML engine, the request for information from the document by applying both a semantic Deep Learning Transformer Based Model and at least one Feature-Based Dimension Machine Learning model; generate a composite similarity score for similarity of the request for information from the document to a request for information in the plurality of historical documents based on the analyzing; and produce a suggested response or responses to the request for information based on a ranked order of similarity scores.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 1AA-1F illustrate a graphical user interface in accordance with exemplary embodiments.

FIGS. 3A-3K illustrate a flow diagram illustrating a document response production method in accordance with exemplary embodiments.

FIGS. 5A-5I illustrate computation of similarity scores in accordance with exemplary embodiments.

FIGS. 6A-6H illustrate computation of similarity scores in accordance with exemplary embodiments.

FIGS. 7A-7I illustrate computation of similarity scores in accordance with exemplary embodiments.

FIGS. 8A-8J illustrate computation of similarity scores in accordance with exemplary embodiments.

FIGS. 9A-9G illustrate computation of similarity scores in accordance with exemplary embodiments.

FIGS. 10A-10I illustrate computation of similarity scores in accordance with exemplary embodiments.

DETAILED DESCRIPTION

Figure 2A:
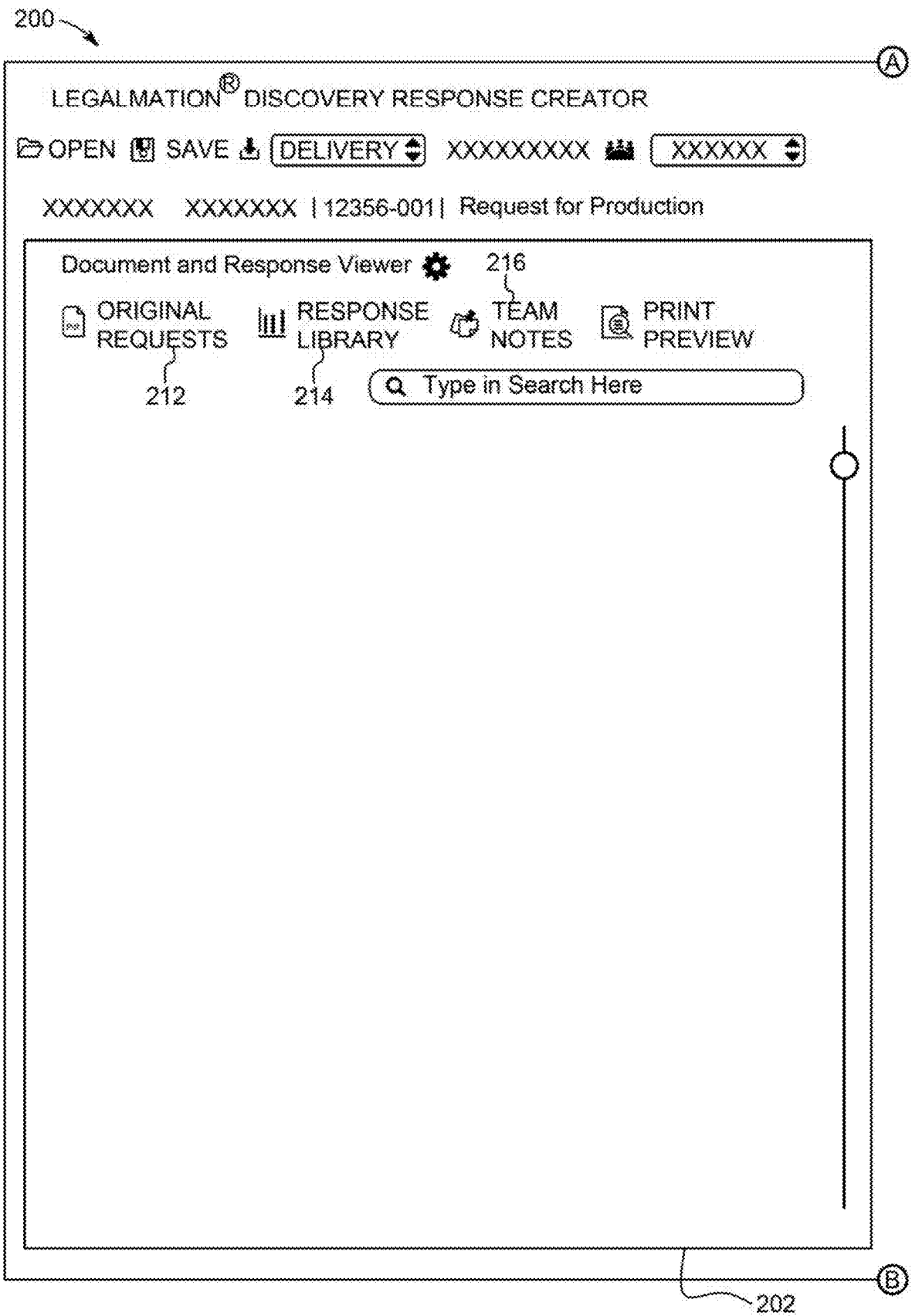
FIGS. 2AA-2GB illustrate a graphical user interface in accordance with exemplary embodiments.
Figure 2A:

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The methods and systems described herein may be implemented using computer programming or engineering techniques including computer software, firmware, hardware or any combination or subset thereof.

FIGS. 1AA-1F illustrate a graphical user interface (GUI) 100 in accordance with exemplary embodiments. The GUI 100 is used for a document response production method executing on a computing device (e.g., computer 805) including processing circuitry (e.g., processor 835), a display screen (e.g., display 870), and a non-transitory computer-readable medium (e.g., memory 840, non-volatile storage 845, etc.) storing executable instructions (e.g., computer program 848) which when executed by the processing circuitry perform the method. In an exemplary embodiment, the document is a request for production, subpoena, an interrogatory, a demand letter, or a complaint for a legal proceeding. However, the document is not limited to these examples and could be another legal document or a non-legal document. The GUI 100 is first used to upload the document (e.g., discovery request, etc.). After the steps described in detail below are performed, the GUI 100 will facilitate the automatic creation of a response document that replies to the document that was uploaded. For example, if the document that is uploaded is an interrogatory, the document that is automatically produced using the GUI 100 is a response to the interrogatory.

Before the document is uploaded, the jurisdiction of the legal proceeding is selected (e.g., California, etc.), and the document is uploaded, for example, by dragging and dropping the file into a box displayed by the GUI 100 or by browsing the computer files on the computing device. After the document is uploaded, the practice area is selected (e.g., employment, personal injury, etc.). Alternatively, the jurisdiction and practice area could be determined by the following AI/ML process. The document is then processed by various software engines (including using artificial intelligence and machine learning ("AI/ML") engine that will be discussed in further detail below). After the document is processed, a verification page is displayed by the GUI (100) in which the user can verify various fields that are automatically populated based on information in the document such as, for example, Matter ID, jurisdiction, plaintiff name(s), defendant name(s), parties, law firm information, opposing counsel information, attorney information, etc.

After the fields have been verified, the screen shown in FIGS. 1AA-1AB is displayed. FIG. 1AA shows the left side of the screen, and FIG. 1AB shows the right side of the same screen. This applies to several of the following figures, such as FIGS. 1BA and 1BB. On this screen, the user is prompted to fill out responses and objections to each individual request that was detected by the system. On this page, there are three main sections/areas of the GUI 100: a document viewer area 106, a virtual assistant area 104, and a text editor area 102. The document viewer area 106 is where a user can review the document uploaded via an "Original Request" tab 120, as well as a response library 122 and team notes 124. At the top right of the screen, an "In Progress" counter is displayed that shows the user how many requests they have responded to, as well as how many requests the user is still in the process of responding to. Clicking on any of the requests for production (e.g., Request for Production No. 3, 108) or in the edit box beneath each request, within the text editor area 102 will open that request and allow you to generate and edit a response to it in the text box 110. The user can enter the response text manually, or they can use the virtual assistant in the virtual assistant area 104 to automatically enter suggested objections 112 for this response. As an example, in FIG. 1AA, Request for Production No. 3 is a request for "Any DOCUMENT or other evidence (as defined by Evidence Code § 140)(including, but not limited to, incident reports; interoffice memorandum; claim notes; e-mail or other correspondence) which refers to plaintiff."

The virtual assistant area 104 includes an "Objections" tab 114 and a "Closest Matches" tab 116. Under the "Objections" tab 114 of the virtual assistant area 104, the AI/ML engine will suggest which objections could be included for the request the user is currently working on, based on its interpretation of the original request text. These suggestions are highlighted (for example, in green) and checked automatically. However, the user can uncheck or check any objections that they deem applicable. As the objections are checked, the standard corresponding text will automatically appear in the text box 110 for the response that the user is currently editing. In FIG. 1AB, the suggested objections are "Vague/Ambiguous-Overbroad," "Reasonable Particularity," and "Attorney-Client/Work Product." The standard corresponding text for these three suggested objections states "CLIENT NAME objects on the basis that the question is vague and ambiguous and overbroad and burdensome. CLIENT NAME further objects because the request is not reasonably particularized. The request also asks for information covered by the attorney client privilege and/or attorney work product. Subject to these objections, Responding party responds as follows:."

In FIGS. 1BA-1BB, in addition to these standard objections, the system will also suggest a number of requests that it has determined may be similar to the one the user is currently working on under the "Closest Matches" tab 116. Selecting one of these options 118 will add response text modelled on the response text the user's law firm has previously used for the closest-matching request that is selected by the user. In an exemplary embodiment, as shown in FIG. 1F, a "Ranked Responses" tab 115 can be displayed next to the "Objections" tab 114, and when the user clicks on this tab, a percentage 117 is displayed next a corresponding suggested response. The percentage can indicate the amount of the time the particular response is selected based on an analysis of the historical responses to similar request types. A response is selected by the user selecting the check box 119 next to the response. In FIG. 1CB, under the "Response Library" tab 122 of the Document Viewer section, the user can view all closest matching requests and their respective responses that pertain to the request currently being worked on. This allows the user to view all closest matching requests, suggested by the AI/ML engine, in one place without having to select each individually. If preferred, the user can also copy the response text from this section, and paste it into the text box 110, rather than generating an AI/ML response. A user can also insert any custom responses that they have created by selecting a "Custom Responses" tab that can be displayed next to the "Closest Matches" tab 116.

Once the user has finished adding and editing the responses that they wish to include for the request they are working on, the text is saved by clicking the "save response" button to the top right of the text box 110. This will save the selected response as "Completed," and automatically move the user to the next request (e.g., "Request for Production No. 4"). The user can also add a "team note" 126 to each response by clicking on the "Team Notes" tab 124. This will open a pop-up window where the user can notate the selected response. See FIG. 1DB. In FIG. 1EA, words in the request are highlighted ("incident report") and a shortcut menu 128 is displayed that allows the user to perform various functions such as add custom objection, and add team notes. Once the user has entered text and saved each individual response, a "GO" button at the bottom of the GUI 100 will turn orange, and the user will be able to click on it to generate their output (response document).

In an exemplary embodiment, the document response production method includes receiving, as input, a document with a plurality of requests for information, wherein each request for information is a text string. As seen in FIGS. 1AA-1AB, the text string is a plurality of words, numbers, symbols, etc. in one or more sentences. The graphical user interface 100 is displayed on the display screen by the processing circuitry. As seen in FIGS. 1AA-1AB, the graphical user interface 100 simultaneously displays the document viewer area 106, the virtual assistant area 104, and the text editor area 102 on one display screen. The received document is displayed in the document viewer area 106. The method also includes receiving, as input, a selected request for information from among the plurality of requests for information (e.g., "Request for Production No. 3"). The method also includes displaying, in the virtual assistant area 104, one or more automatically selected recommended grounds for objection to the selected request for information (e.g., the three highlighted objections 112 in FIG. 1AB), and displaying, in the virtual assistant area 104, one or more other selectable potential grounds for objection (the other listed objection in FIG. 1AB that are not selected). Based on the selected request for information and the selected recommended grounds for objection, a text string response is automatically generated (by, for example, the AI/ML engine) to the selected request for information. The method includes displaying the text string response in the text editor area 102 (specifically, in the text box 110). The text string response is modifiable by user input. In a non-limiting embodiment, the text string response is automatically generated by the AI/ML engine. In a non-limiting embodiment, the one or more automatically selected recommended ranked and suggested grounds for objection are determined by the AI/ML engine. Other examples of non-limiting embodiments include the AI/ML engine providing: (i) ranked and suggested responses to an interrogatory request; (ii) ranked and suggested response to requests for production; (iii) ranked and suggested responses to issues found in a demand letter; (iv) ranked and suggested responses to subpoena inquiries such as likely account information to the subject account holder; (iv) ranked and suggested responses to allegations from a lawsuit or administrative claim, (v) ranked and suggested responses to insurance coverage demands; (vi) ranked and suggested responses to customer complaints; and (v) ranked and suggested responses to public record requests. In a non-limiting embodiment, the method includes receiving a user save operation input; and saving, in the non-transitory computer-readable medium (e.g., memory 840) or another non-transitory computer-readable medium, the text string response. In a non-limiting embodiment, the method also includes producing a response document including the text string response. For example, the response document is created after clicking on the "GO" button. In a non-limiting embodiment, the method includes displaying the response document on the display screen (e.g., display 870); and printing, with a printer (inkjet printer, laser printer, etc.), the response document. In an exemplary embodiment, the system can rank responses and display, for example in the virtual assistant area 104 (as shown in FIG. 1F), percentages of what which response types historically have happened (for example, "will produce" (79%), "will not produce-stand on objections" (11%), "will produce after P.O." (5%), "unable to produce—docs do not exist" (5%)). This percentage can be expressed as a frequency of occurrence or confidence percentage based on similarity score of similar requests for information or other algorithm at the user's preference.

In a non-limiting embodiment, a non-transitory computer-readable storage medium stores thereon executable instructions which when executed by processing circuitry causes the processing circuitry to perform the document response production methods described herein.

Figure 2B:
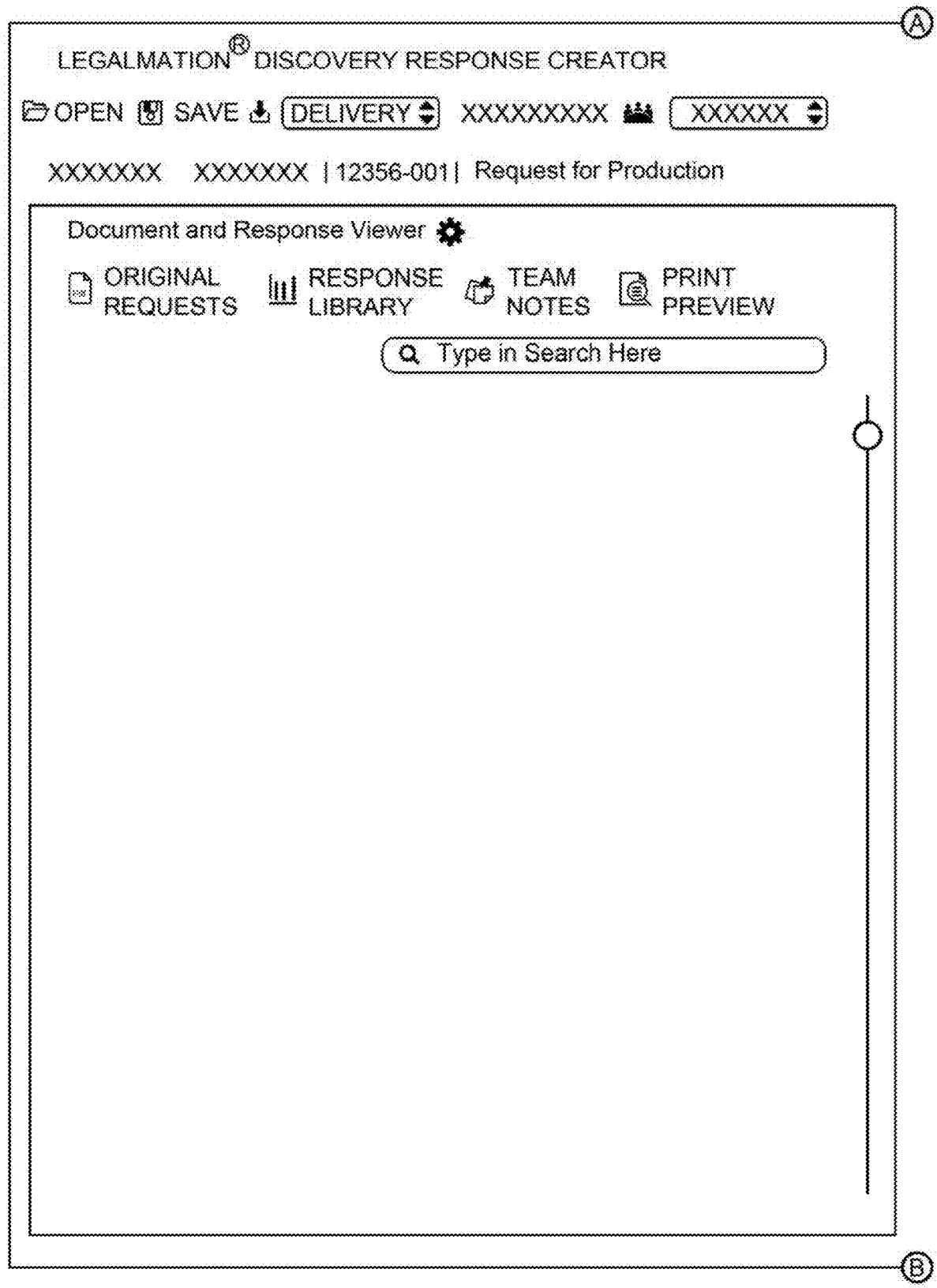

FIGS. 2AA-2GB illustrate a GUI 200 in accordance with exemplary embodiments. In FIGS. 2AA-2AB, in step 5200, a user has already answered two requests, and is working on the third request 218. FIGS. 2AA-2AB show several areas of the GUI 200 which include a document and response viewer 202, a request area 204, a closest match area 206, a suggested objections area 208 and a client model response area 210. The document and response viewer 202 includes an "Original Request" tab 212, a "Response Library" tab 214, and a "Team Notes" tab 216 that are similar to the "Original Request" tab 120, a "Response Library" tab 122, and a "Team Notes" tab 124 previously discussed. In FIGS. 2BA-2BB, in step S202, the user is selecting the closest match of the request (Request No. 3) in the closest match area 206. Based on this selection, the suggested objections are displayed in suggested objections area 208, and a response is automatically populated in the client model response area 210.

Figure 2D:

In FIGS. 2CA-2CB, in step 5204, the user is clicking on the "Response Library" tab 214, and the response library 216 is displayed. In FIGS. 2DA-2DB, in step 5206, the user is clicking the save icon to save the prepared response displayed in the client model response area 210. FIG. 2EB shows that a completed request 218 has an associated check box 220 that indicates that a response to the request has been completed. Request 222 is not completed, and does not have an associated check box 220.

Figure 2G:
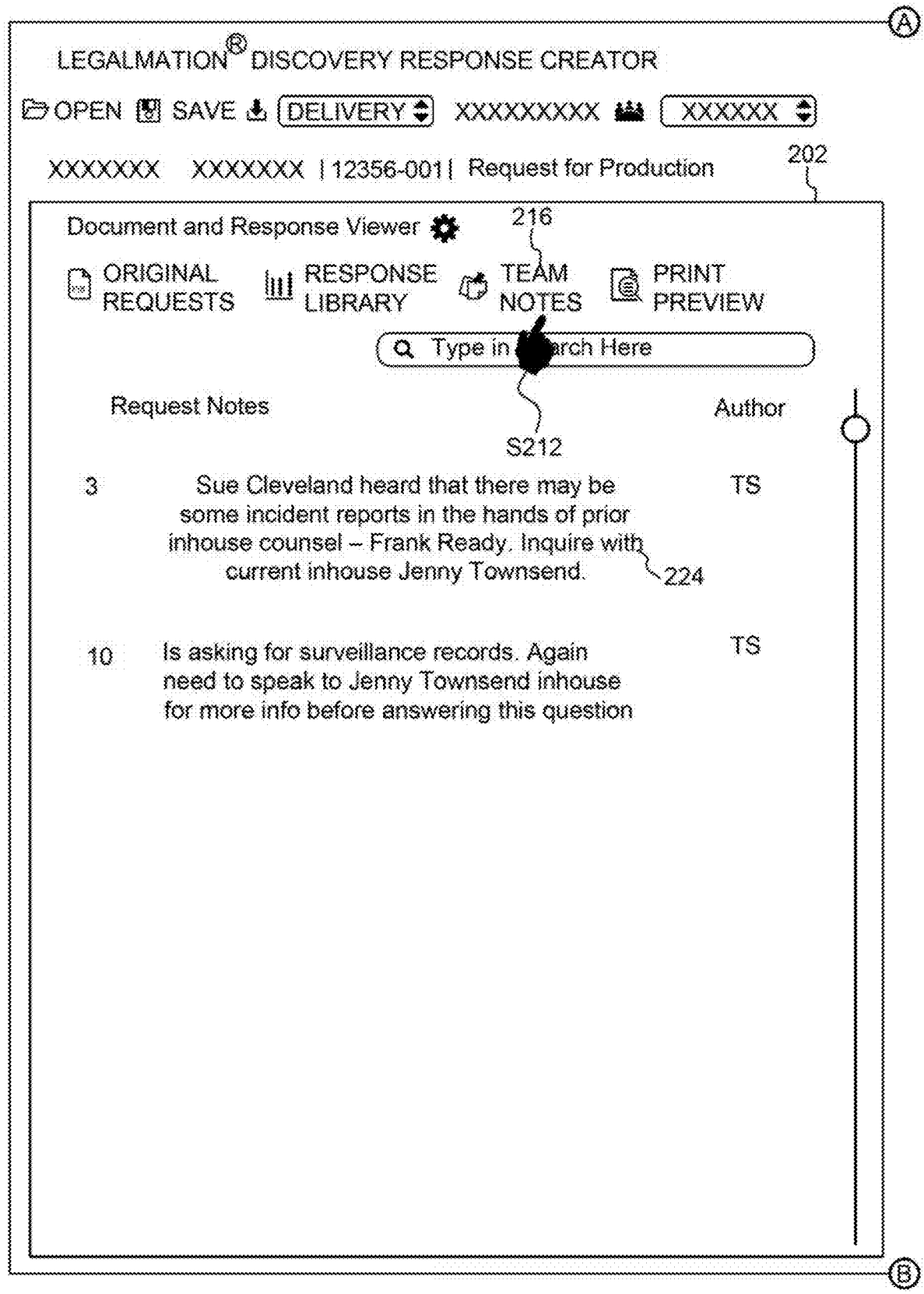

In FIGS. 2FA-2FB, in step 5208, the user clicks on the "Original Request" tab 212, and the original request is displayed. In step 5210, the user can drag an icon to scroll down the original request document. In FIGS. 2GA-2GB, in step 5212, the user clicks on the "Team Notes" tab 216 to view any team notes associated with any request. Notes are displayed regarding Request No. 3 and Request No. 10. The initials of the author who created the note is also displayed.

Figure 3E:
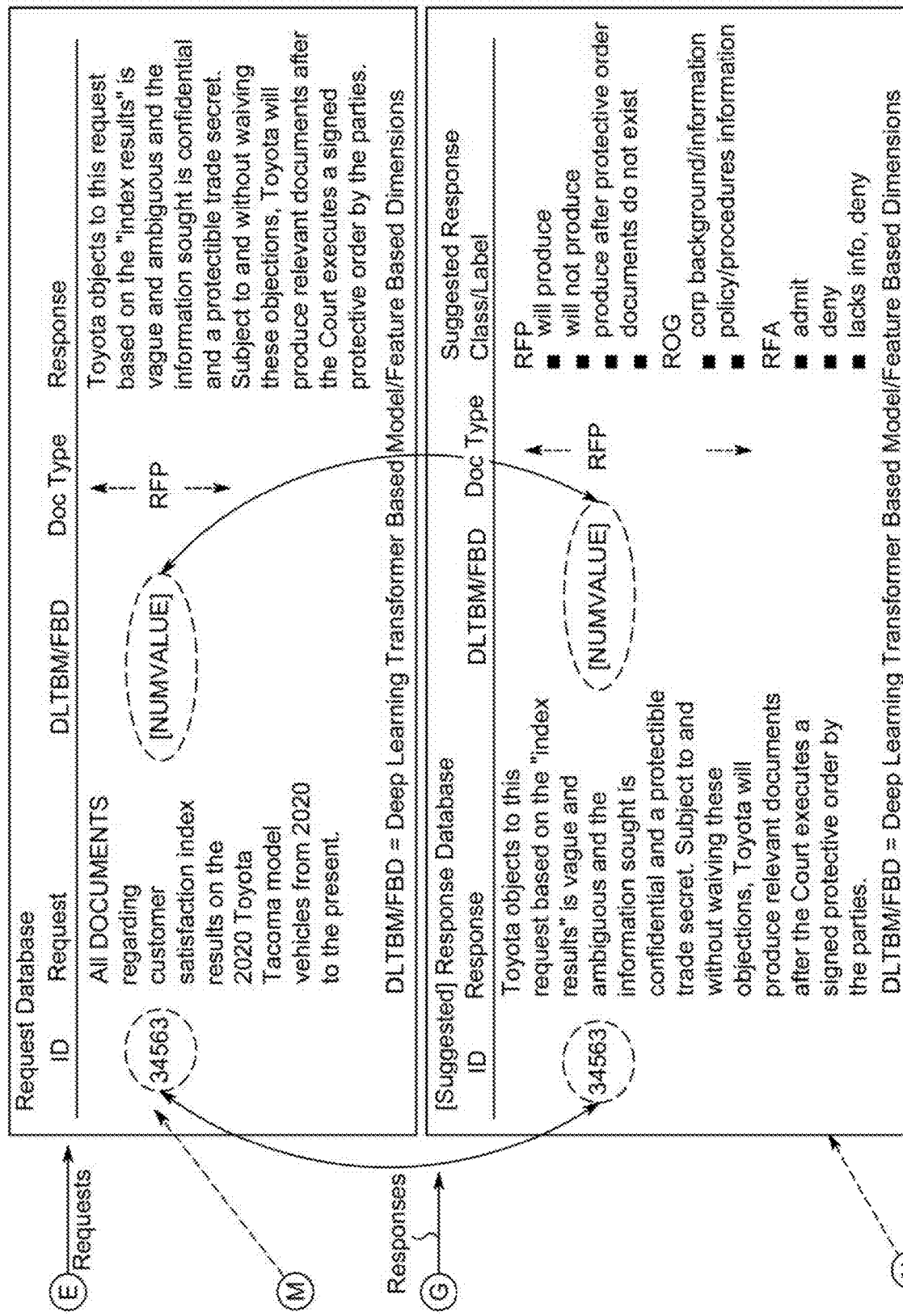

FIGS. 3A-3K illustrate a flow diagram illustrating a document response production method in accordance with exemplary embodiments. Specifically, FIGS. 3A-3E illustrate a training process of the AI/ML engine in accordance with exemplary embodiments. FIGS. 3F-3K illustrate the user's process of uploading a request document and the steps for the system to automatically produce a response document in reply to the request document. In FIGS. 3A-3K, discovery requests/response is used as an example, but any request/demand that has a corresponding response can be used (such as, for example, subpoenas, demand letters, etc.). Step S402 in FIG. 3A illustrates an input process where the user uploads pairs of past/historical documents to train the AI/ML engine. The historical documents are uploaded into the database. Examples of the pairs of documents include: Requests for Productions (Requests and Responses), Interrogatories (Requests and Responses), Requests for Admissions (Requests and Responses), Subpoenas (Requests and Responses), Demand Letters (Demand Letters and Responses), Lawsuit (Allegations and Responses), Administrative Claim (Allegations and Responses), Insurance Coverage Demands (Demand Issues and Responses). The amount of training pairs uploaded can vary depending on the complexity and variance of the subject matter, jurisdiction, issues, responses, etc. In an exemplary embodiment, the training documents are uploaded by File Transfer Protocol (FTP), a web-based drag and drop operation on the GUI, etc. The uploading process is performed in order to provide training data for pairwise sentence matching that is used to create a historical data warehouse. In a non-limiting embodiment, training may also occur via an Active Learning human annotation process with user selecting the labeled checkboxes that link the request to the appropriate response types. The collection of user selected selections can then be used to build and/or supplement training of the AI/ML engine.

Step S404 in FIG. 3B illustrates a data preparation process. During this step, sorting, extracting, and normalizing is performed. For example, extracting information from the historical documents is performed, separating the historical documents is performed, and preprocessing is performed on the historical documents. The historical documents can be sorted by document type. Requests/demands can be extracted. Request/Demand-Response pairs can be sorted. In an exemplary embodiment, the pre-processing that is performed uses stop words and Named Entity Recognition (NER) replacement. A stop word is a word that you can remove from a sentence as it is not necessary for AI/ML training purposes (e.g., on, the, to, from, etc.). An example of NER replacement is switching a specific name such as "Joe Smith" to a generic phrase/label such as "Name." Labelling a specific number (e.g., an account number, address, telephone number, etc.) that is not necessary to a generic label can also be performed.

In an exemplary embodiment, the data preparation such as sorting can be performed by regular expression (RegEx) boolean searches, AI techniques, Machine Learning (ML) techniques, Active Learning, and human annotation. RegEx can be domain specific, that is for every domain (employment, personal injury, etc.) the rules that the system uses to sort are different based on the domain. Active learning, for example, includes back propagating data and capturing keystrokes. In an exemplary embodiment, the human annotation process can include adding different metadata fields to historical requests, and this is done for normalization of the data. An example of a normalized data set is that there could be a policy number associated with a historical request. In this case, the system can use NER replacement for the specific policy number with a generic label such as "NUMBER" and replace a specific person's name with "NAME." Also during data preparation, terms can be tagged that are not likely to create false positives in context to the response (e.g., terms such as "attorney work product", "compound," overbroad, etc. are used in very precise ways). The data preparation process is important as it ensures consistency of training data in the steps that follow. The lower portion of FIG. 3B shows an example of a paired request and response at this stage of processing.

Step S406 in FIG. 3C illustrates an AI/ML Natural Language Processing (NLP) classification process in which the AI/ML engine is used to analyze each request, each request is broken down by tokenization, each request with its tokens is uploaded, and the AI/ML engine is used to identify/evaluate tokens. This process uses a variety of different models to increase accuracy. For example, if five different AI/ML models are used and the ensemble setup requires the majority of the models to agree on a classification or answer, there is a higher likelihood of a more accurate response than if any single model was being asked to classify the same request. This process takes the strengths of certain processes and combines them together for increased accuracy for an ensemble AI/ML process. In step S406, this is where the AI/ML engine starts analyzing the request. First, the AI/ML engine breaks down the words of the sentence into tokens (i.e. the words, numbers, symbols, etc. are the tokens). Next, one or more Deep Learning Transformer Based Models (e.g., Bidirectional Encoder Representations from Transformers (BERT) by Google®, RoBERTa, LegalMation Domain (which is fine-tuned custom models), word embeddings, and Word Movers Distance (WMD) are applied, for example by the AI/ML engine, on the tokens of the request. In an exemplary embodiment, the word embeddings can be, for example, Word2Vec, Glove, fine-tuned custom embeddings, etc.

In addition to this step using one or more Deep Learning Transformer Based Models described above, this step can also use one or more different types of Feature-Based Dimensions Machine Learning. When the Feature-Based Dimensions Machine Learning is combined with Deep Learning Transformer Models, the results are more accurate than only using one of these. In an exemplary embodiment, the Feature-Based Dimension Machine Learning process includes, for example, one or more of clustering, a k-nearest neighbors (KNN) algorithm, agglomerative clustering, a support vector machine (SVM) method, logistic regression, Naive Bayes, decision trees, conditional random fields (CRF), and bi-directional long-short term memory (Bi-LSTM), etc. Which particular Feature-Based Dimension Machine Learning process that is used depends on what document is being analyzed (subpoena, interrogatory, etc.) In an exemplary embodiment, more than one of the Feature-Based Dimension Machine Learning processes can be used in combination. This is an ensemble based approach which results in greater accuracy due to more than one model being used by the system. The lower portion of FIG. 3C shows an example of a paired request and response at this stage of processing. As can be seen, the request and response are both broken down into tokens (each token separated by "1"). NLP and tokenizing are described in U.S. Pat. No. 10,140,273 by Biegert et al., issued Nov. 27, 2018; U.S. Patent Publication No. 2011/0040553 by Sasivarman, published Feb. 17, 2011; U.S. Pat. No. 9,471,627 by Boyle et al., issued Oct. 18, 2016; U.S. Patent Publication No. 2015/0261745 by Song et al., published on Sep. 17, 2015; and U.S. Pat. No. 10,303,999 by Hertz et al., issued on May 28, 2019, the entire contents of each of which are incorporated herein by reference. ML/AI processing is described in U.S. Patent Publication No. 2018/0268506 by Wodetzki, published on Sep. 20, 2018, the entire contents of which are incorporated herein by reference. Deep learning is described in U.S. Pat. No. 9,552,548 by Brestoff, issued Jan. 24, 2017, the entire contents of which are incorporated herein by reference.

In an exemplary embodiment, the system can also use a negation detector to detect negation cues in the request text. Negation detection is described in U.S. Patent Publication No. 2020/0250381 by Guo, published on Aug. 6, 2020, the entire contents of which are incorporated herein by reference.

Step S408 in FIGS. 3DA and 3DB illustrate a process of storing the data in the user's (i.e. client's) historical data warehouse. In an exemplary embodiment, the historical data warehouse can be, for example, one or more of memory 848, non-volatile storage 845, remote computer 815, web server 820, cloud storage server 825, computer server 830, etc. In step S408, examples of what are stored and indexed include: each request (transformer-based identification markers), each request paired with its corresponding response, each request is broken down via tokenization, each request is uploaded with its tokens. The system performs an explainable AI/ML process as it explains how the result is obtained. This is done by the AI/ML engine using an ensemble process to identify, evaluate, and measure token features. For example, a sentence can be featurized, it can be assigned a class description, a features identification description, and then a unique ID number can be assigned (similar to a unique warehouse part number). If the sentence has a certain feature, then the system assigns it a corresponding part number. For example, the request is assigned an ID number (ID Request, shown in FIG. 3E), it is given a feature ID number, metadata is associated with it that signifies what the document type is (e.g., Request for Production (RFP), Interrogatory (ROG), Request for Admission (RFA), Subpoena Duces Tecum (SDT), etc.), and the request is also associated with its corresponding response. FIG. 3E shows an example of a paired request and response stored in the historical data warehouse (e.g., database, memory, etc.). The suggested response has the same ID number (34563) as the paired request and response stored in the request database. The document type (e.g., RFP) is also associated with the paired request and response.

FIGS. 3F-3K illustrate the user's process (i.e., user experience) of using the system and uploading a new request document and the steps for the system to automatically produce a response document in reply to the request document. This process focuses on the new request document and then matching a new request in the document to all the similar requests in the historical data warehouse, and then for the system to perform computational and statistical approaches to provide suggested responses and next steps.

Figure 3F:
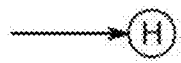

Step S410 in FIG. 3F illustrates a process of inputting a new request document into the system for analysis. In this step, the user uploads the new request document (Interrogatory, Subpoena, Demand Letter, etc.) into the system by using the GUI 100 to perform a web-based drag and drop operation of the electronic file of the document (PDF, Word Document, etc.) or browsing on the computing device for the file in order to upload it. Next, the process moves on to Step S412.

Figure 3G:
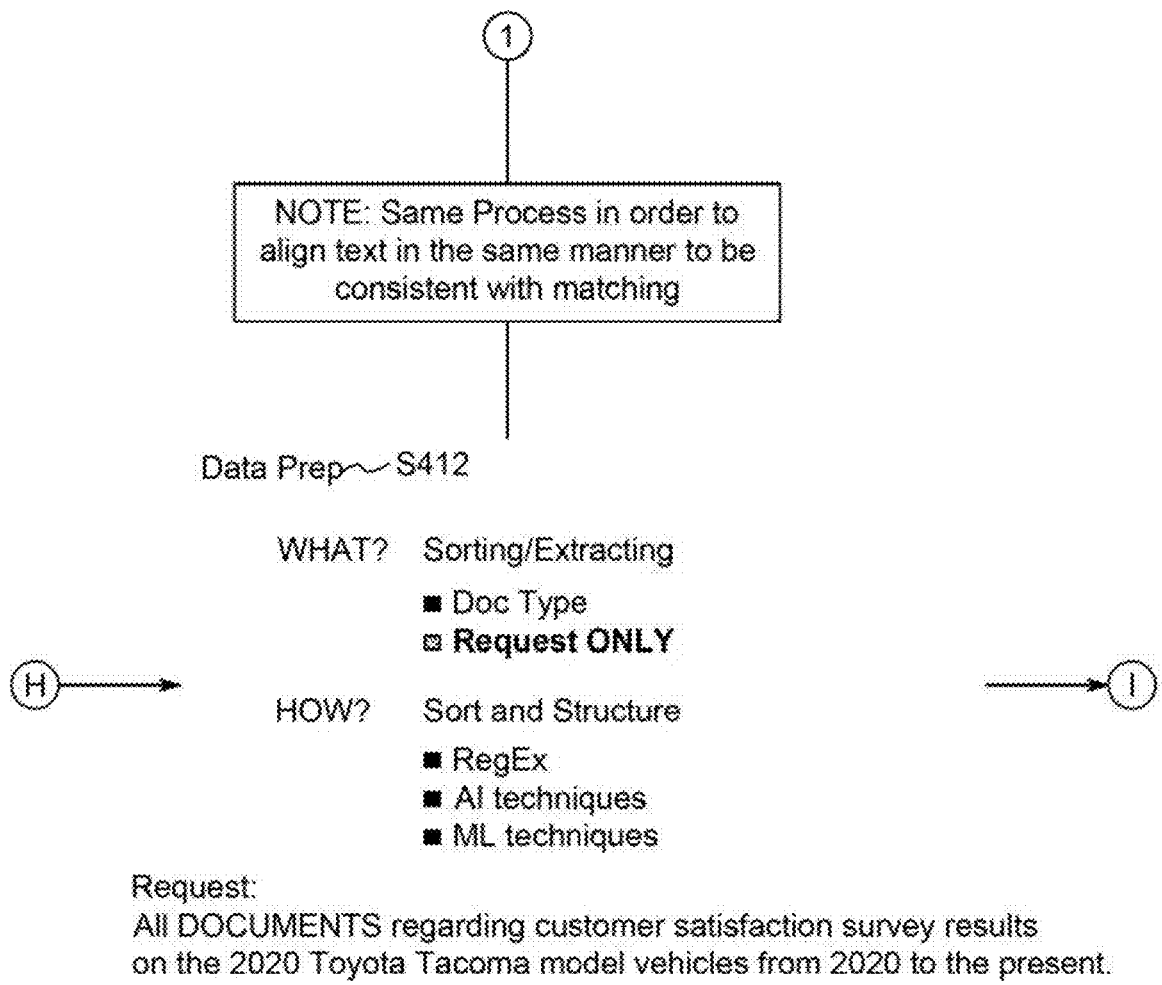

Step S412 in FIG. 3G illustrates the data preparation process after the new request document has been uploaded. This is the same process as in step S404 of FIG. 3B in order to align text in the same manner to be consistent with matching, except that it is the new request only that undergoes the data preparation (i.e., a response does not undergo data preparation). The lower portion of FIG. 3G shows an example of a request at this stage. Next, the process moves on to Step S414.

Step S414 in FIG. 3H illustrates an AI/ML classification process in which the AI/ML engine is used to analyze the new request. This is the same process as in step S406 of FIG. 3C in order to align text in the same manner to be consistent with matching, except that it is the new request only that undergoes the classification process (i.e., a response does not undergo classification). The lower portion of FIG. 3H shows an example of a request at this stage. For example, the request is broken down by tokens. Next, the process moves on to Step S416.

Figure 3I:
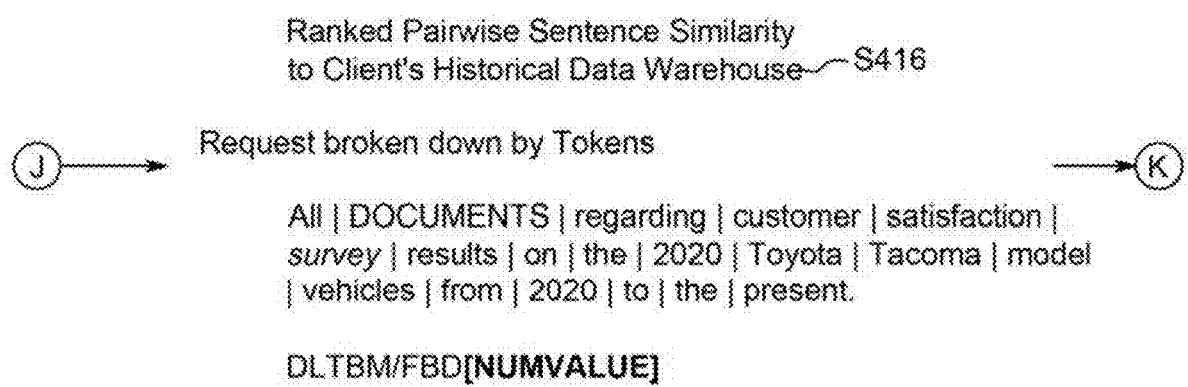
Figure 3J:
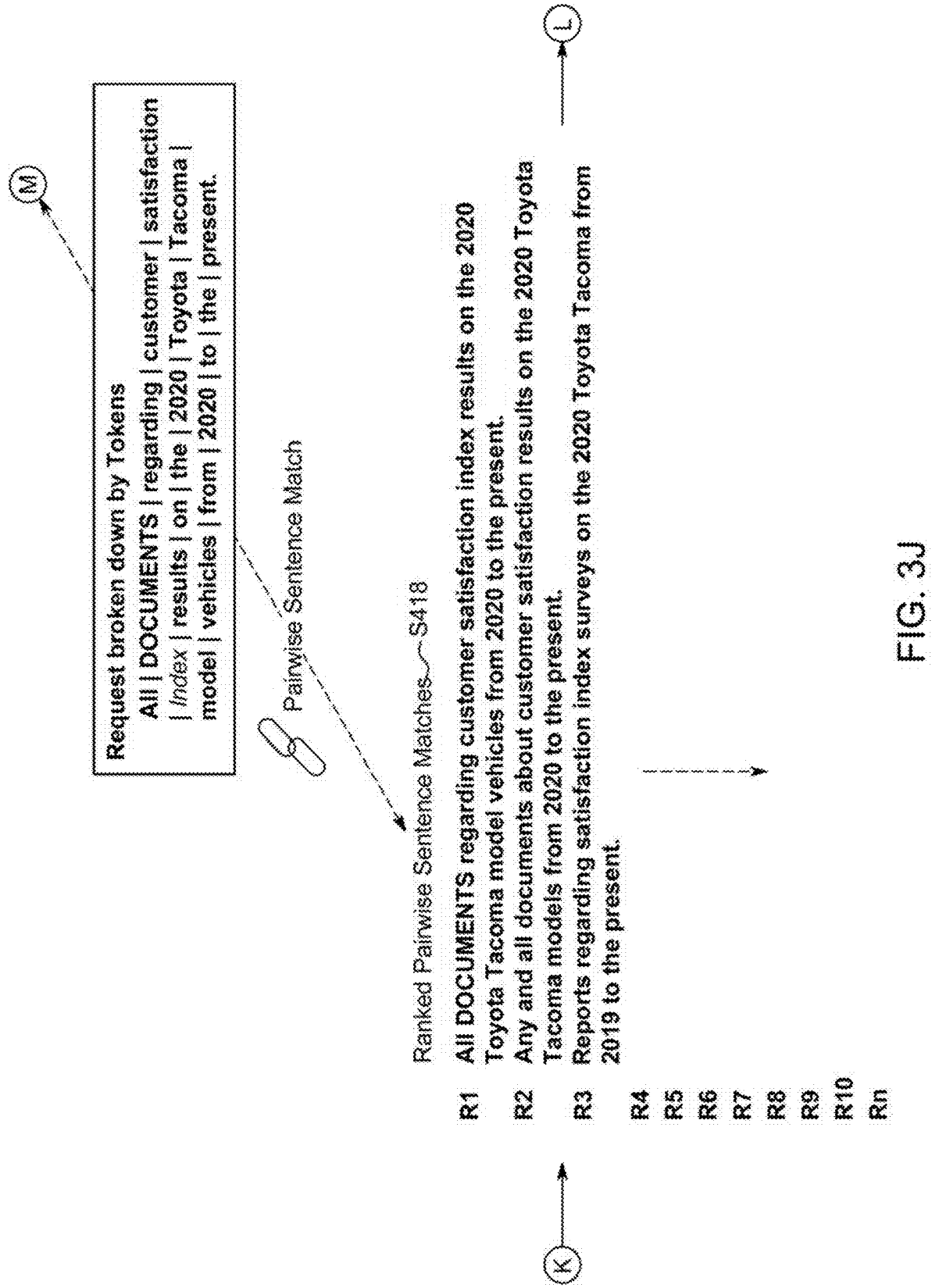
Figure 3K:
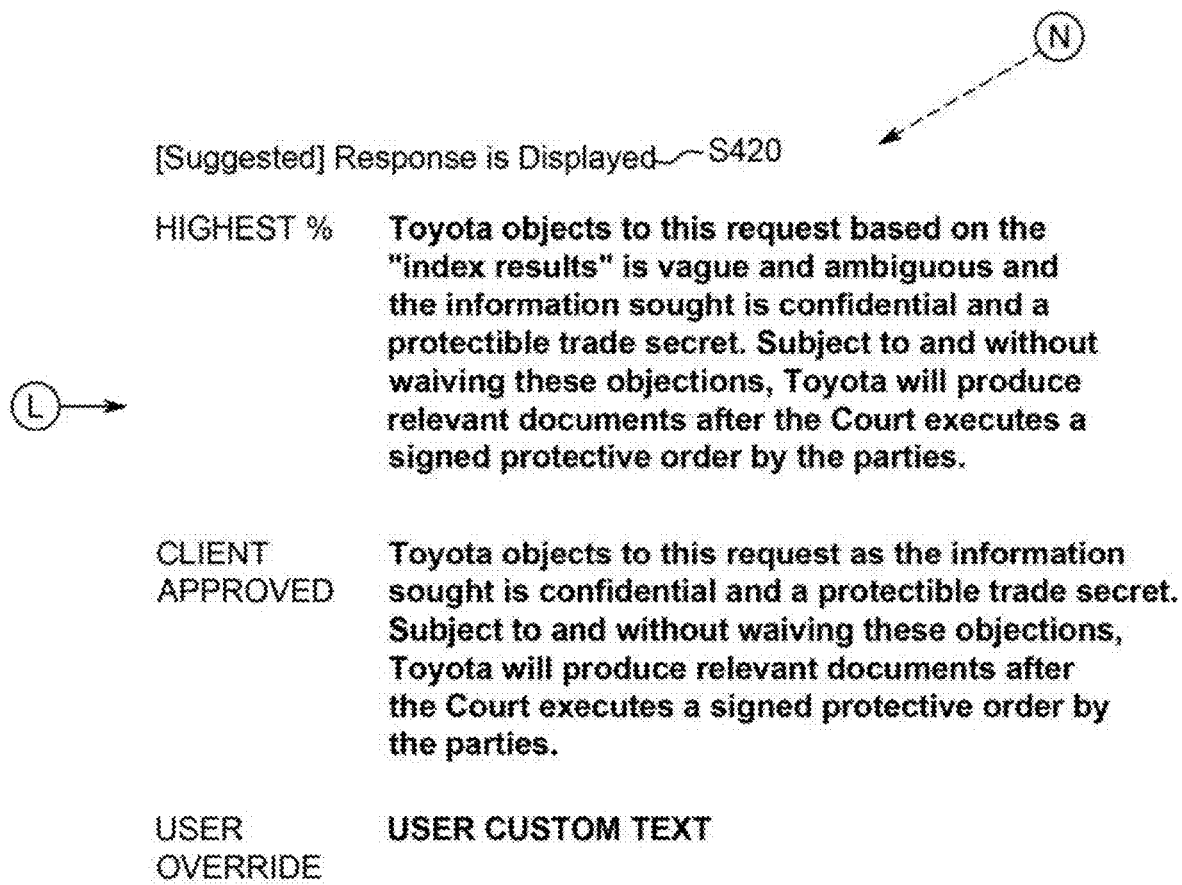

Step S416 in FIG. 3I illustrates how the system performs pairwise sentence similarity comparisons to historical documents stored in the client's historical data warehouse. FIG. 3I shows how the request is broken down by tokens. Next, the process moves on to Step S418.

In step S418, the system ranks the pairwise sentence matches. In an exemplary embodiment, the closer the match, the higher (i.e., better) the ranking. For example, the closest match could be ranked number one. Next, the process moves on to Step S420.

In step S420, the suggested response determined by the system is output for display on a display screen (e.g., display 870).

Figure 4:
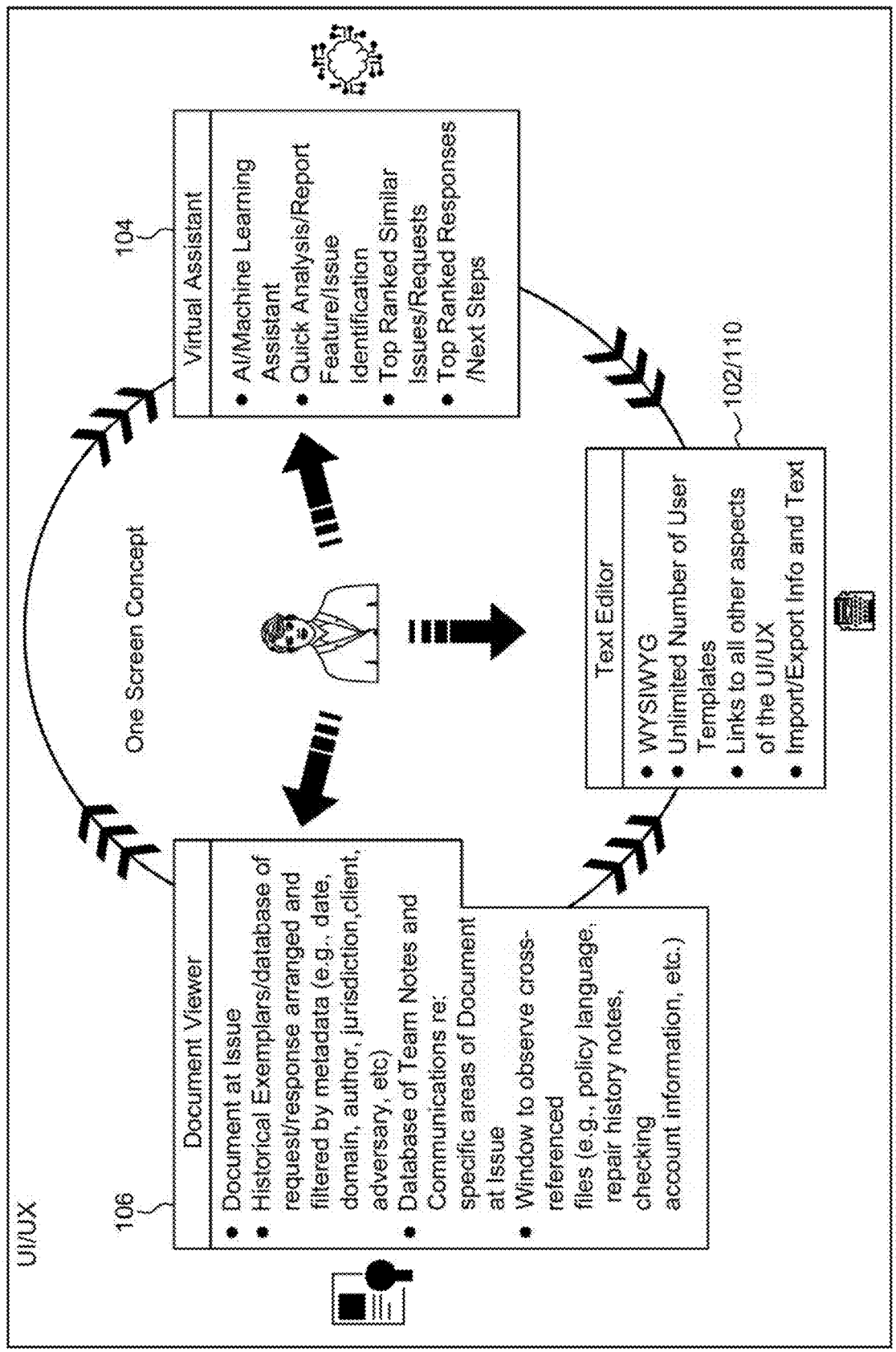
FIG. 4 is a diagram illustrating different parts of a graphical user interface in accordance with exemplary embodiments.

FIG. 4 is a diagram illustrating different parts of a GUI in accordance with exemplary embodiments. This diagram illustrates the one screen concept of the GUI 100 in which one screen simultaneously displays the document viewer area 106, the virtual assistant area 104, and the text editor area 102/110. This diagram also illustrates attributes and features of each of the document viewer area 106, the virtual assistant area 104, and the text editor area 102/110.

Figure 5G:
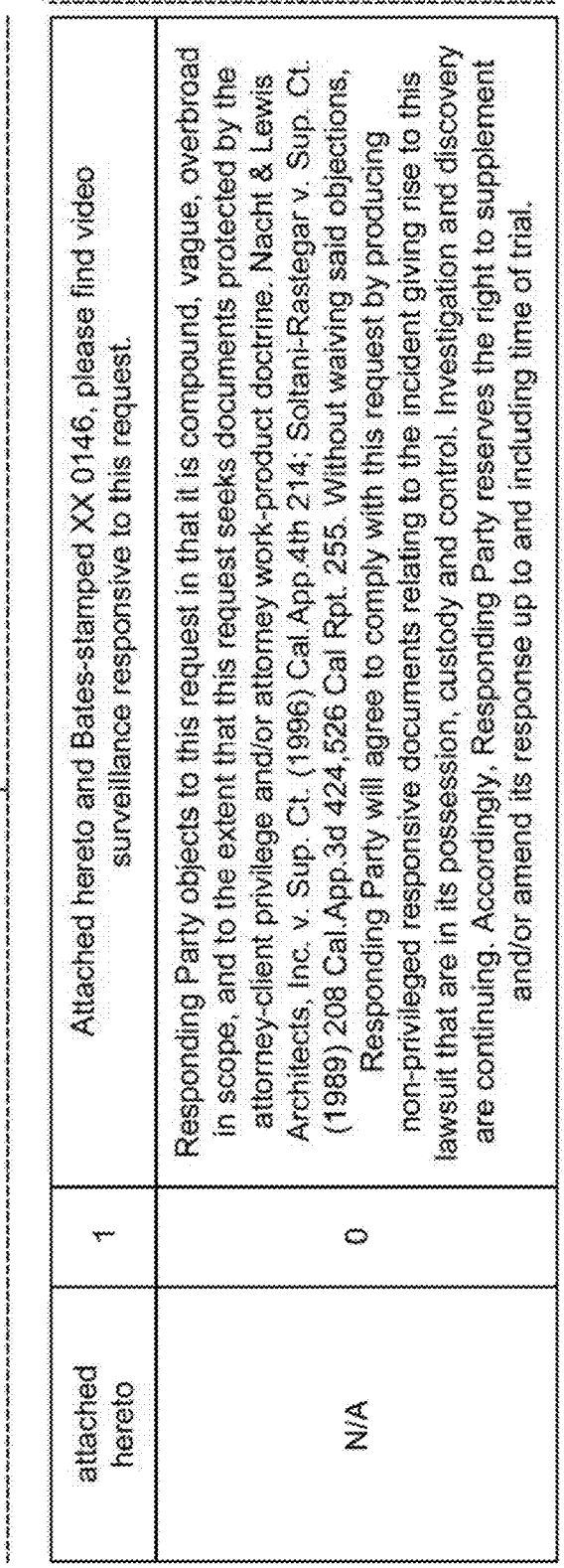
Figure 10I:
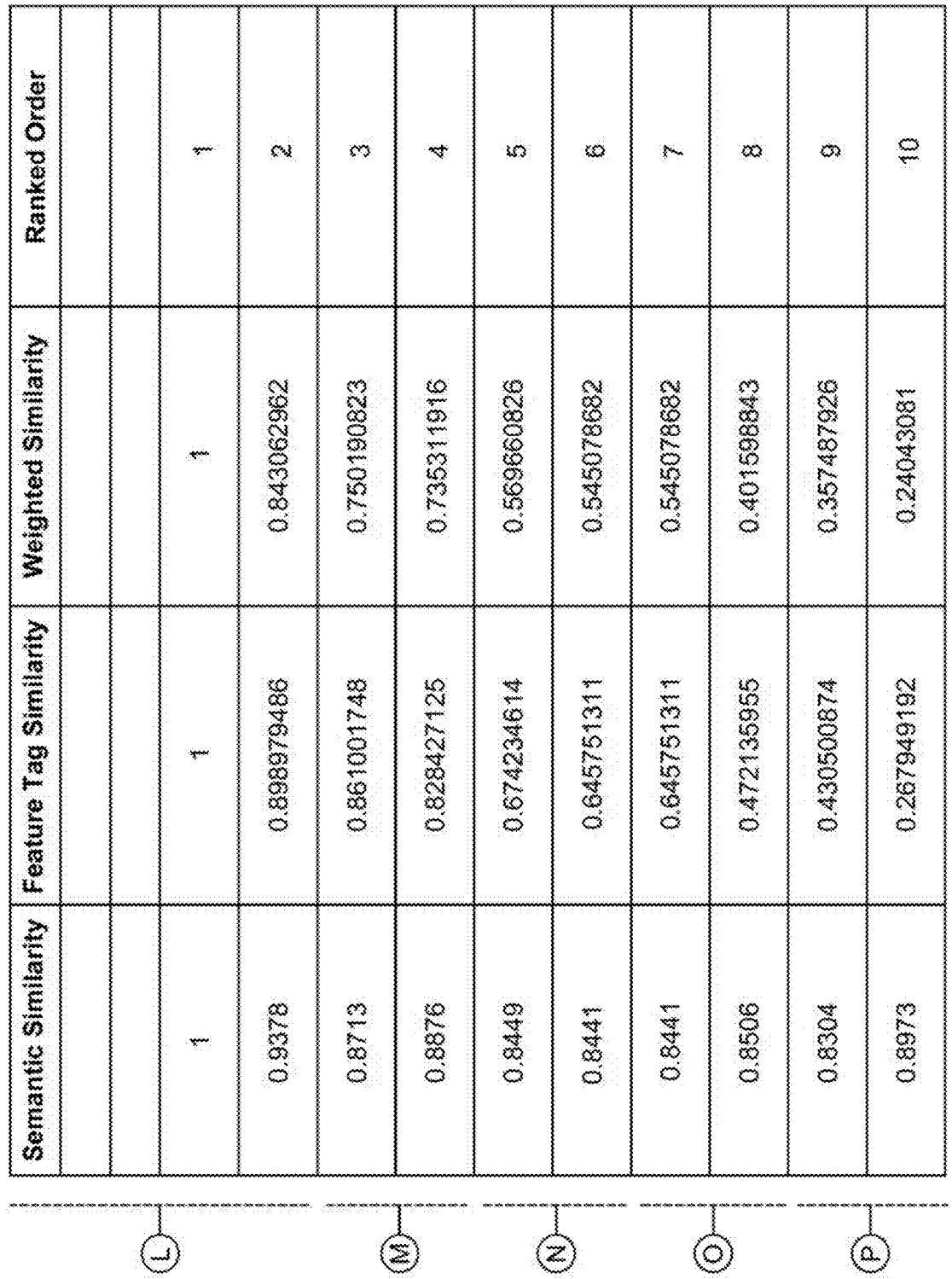

FIGS. 5A-5I illustrate computation of similarity scores in accordance with exemplary embodiments. FIGS. 5A-5I is a chart in which the first column shows the request that the matching is going to be applied to. The second column lists the feature tags that are present in the request. In an exemplary embodiment, the feature tags are mapped to recognized words/tokens present in the request. In the first row of FIG. 5A, the feature tags are the words: "communications," "defendant," "incident," "incident scene," "photo/video," "plaintiff," and "surveillance." Similar rows of requests and corresponding lists of feature tags are shown in FIGS. 5B-5C. FIGS. 5D-5H show the third, fourth, and fifth columns of the chart. The third column shows the Ranked Response Type (RRT) for an associated request. In an exemplary embodiment, the RRT can be, for example, "N/A", "will produce", "attached hereto", "not aware at this time", "never existed", "produced therein", etc. The fourth column shows a RRT code that can be associated with the RRT, and can be, for example, an integer such as 0, 1, 2, 3, 4, etc. The fifth column of the chart displays the content of the response that corresponds to the request of the same row in the chart. FIG. 5I shows the sixth, seventh, eighth, and ninth columns of the chart. The sixth column of the chart, labelled "Semantic Similarity," displays a semantic similarity score. In an exemplary embodiment, the semantic similarity score can be a number n, where $0 \leq n \leq 1$. The seventh column of the chart, labelled "Feature Tag Similarity," displays a feature tag similarity score that is assigned based on the similarity of the feature tags between the new request and a historical request. Featurization is a process in which tags for words are used to find the best match. In an exemplary embodiment, the feature tag similarity score can be a number m, where $0 \leq m \leq 2$. The feature tag similarity score can also be normalized to a $0 \leq m \leq 1$ as well. Thus, for a particular request sentence, there are two similarity scores: (1) a semantic similarity score (1 is the highest score available and that is if it is in the database, and (2) a feature tag similarity score based on featurization of the words in the request (e.g., "documents", "identification", "incident" "maintenance", "persons", "premises", "responsible for," etc.). This score is assigned by the system based on the similarity of the features. The higher the score, the greater the similarity. Thus, the semantic similarity score is based on a first model, and the feature tag similarity score is based on a second model that is different than the first model. Both scores are used by the system to compute a composite score (labelled the "weighted similarity" in FIG. 5I) and then the system performs ranking based on the composite score (the "weighted similarity" score). In an exemplary embodiment, the system computes the composite similarity score by multiplying the semantic similarity score with the feature tag similarity score. The highest composite similarity score is assigned a ranking of "1," the next highest score assigned a ranking of "2," and so on. In an exemplary embodiment, user settable thresholds that can be used to weigh the outcomes of the similarity scores. In an exemplary embodiment, if the system gets above a particular certainty threshold (e.g., a set valued for the composite similarity score) based on the comparison with the new request and the saved requests and paired responses in the database, it will provide a suggested response. If it is below the threshold, the system will not make a suggestion. In an exemplary embodiment, the system also learns the responses that the user selects and uses, and uses this information to feed back into the AI/ML engine to suggest future responses to the user.

FIGS. 6A-6H illustrate computation of similarity scores in accordance with exemplary embodiments. FIGS. 6A-6H show an exemplary chart similar to the chart in FIGS. 5A-5I, but different contents of the requests are present along with different associated values of the various columns.

FIGS. 7A-7I illustrate computation of similarity scores in accordance with exemplary embodiments. FIGS. 7A-7I show an exemplary chart similar to the chart in FIGS. 5A-5I, but different contents of the requests are present along with different associated values of the various columns.

FIGS. 8A-8J illustrate computation of similarity scores in accordance with exemplary embodiments. FIGS. 8A-8J show an exemplary chart similar to the chart in FIGS. 5A-5I, but different contents of the requests are present along with different associated values of the various columns.

FIGS. 9A-9G illustrate computation of similarity scores in accordance with exemplary embodiments. FIGS. 9A-9G show an exemplary chart similar to the chart in FIGS. 5A-5I, but different contents of the requests are present along with different associated values of the various columns.

FIGS. 10A-10I illustrate computation of similarity scores in accordance with exemplary embodiments. FIGS. 10A-10I show an exemplary chart similar to the chart in FIGS. 5A-5I, but different contents of the requests are present along with different associated values of the various columns.

Figure 11:
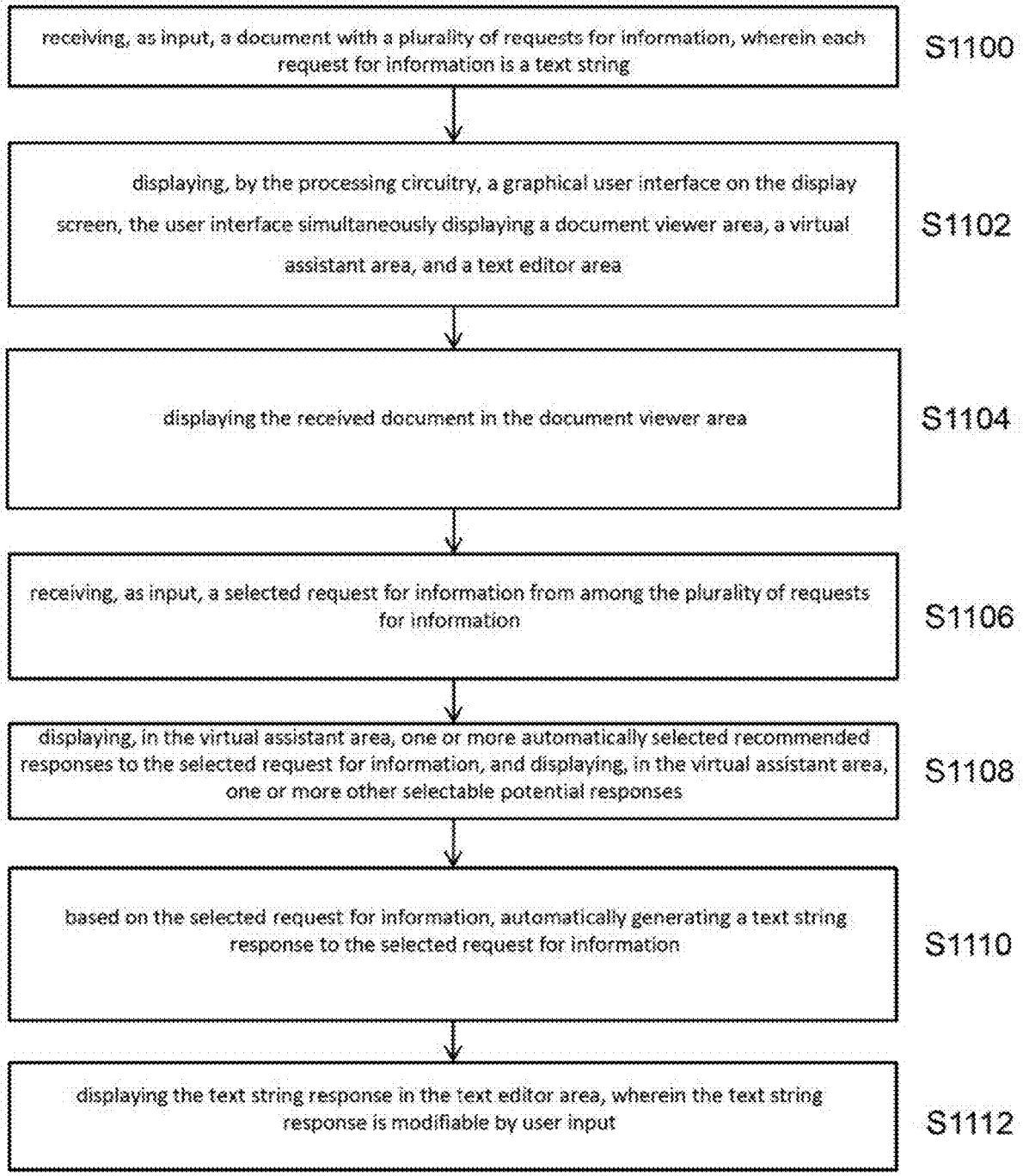
FIG. 11 is a flow diagram illustrating a document response production method in accordance with exemplary embodiments.

FIG. 11 is a flow diagram illustrating a document response production method in accordance with exemplary embodiments. The document response production method executes on a computing device including processing circuitry, a display screen, and a non-transitory computer-readable medium storing executable instructions which when executed by the processing circuitry perform the method. The method includes, in step S1100, receiving, as input, a document with a plurality of requests for information (e.g., the document can be an interrogatory, subpoena, request for admission, etc. In an exemplary embodiment, each request for information is a text string. For example, the text string can be a sentence made up of words, numbers, symbols, etc. Step S1102 includes displaying, by the processing circuitry, a user interface (e.g., GUI 100) on the display screen. In an exemplary embodiment, the user interface simultaneously displays a document viewer area 106, a virtual assistant area 104, and a text editor area 102/110. Step S1104 includes displaying the received document in the document viewer area 106. Step S1106 includes receiving, as input, a selected request for information from among the plurality of requests for information. For example, the user selects Request for Production No. 3 as in FIG. 1AA. Step S1108 includes displaying, in the virtual assistant area 104, one or more automatically selected recommended responses (e.g., grounds for objection) to the selected request for information. For example, as seen in FIG. 1AB, the recommended responses (e.g., objections) 112 are displayed in the virtual assistant area 104. Step S1108 also includes displaying, in the virtual assistant area 104, one or more other selectable potential responses (e.g., the other seven ground for objection shown in FIG. 1AB that are not currently selected but can be selected by the user). In step S1110, based on the selected request for information, automatically generating (for example, by the AI/ML engine) a text string response to the selected request for information. Step S1112 includes displaying the text string response in the text editor area 102. The text string response is modifiable by user input. FIG. 1AA, for example, shows the generated text string response (e.g., one or more sentences) displayed in text box 110.

Figure 12:
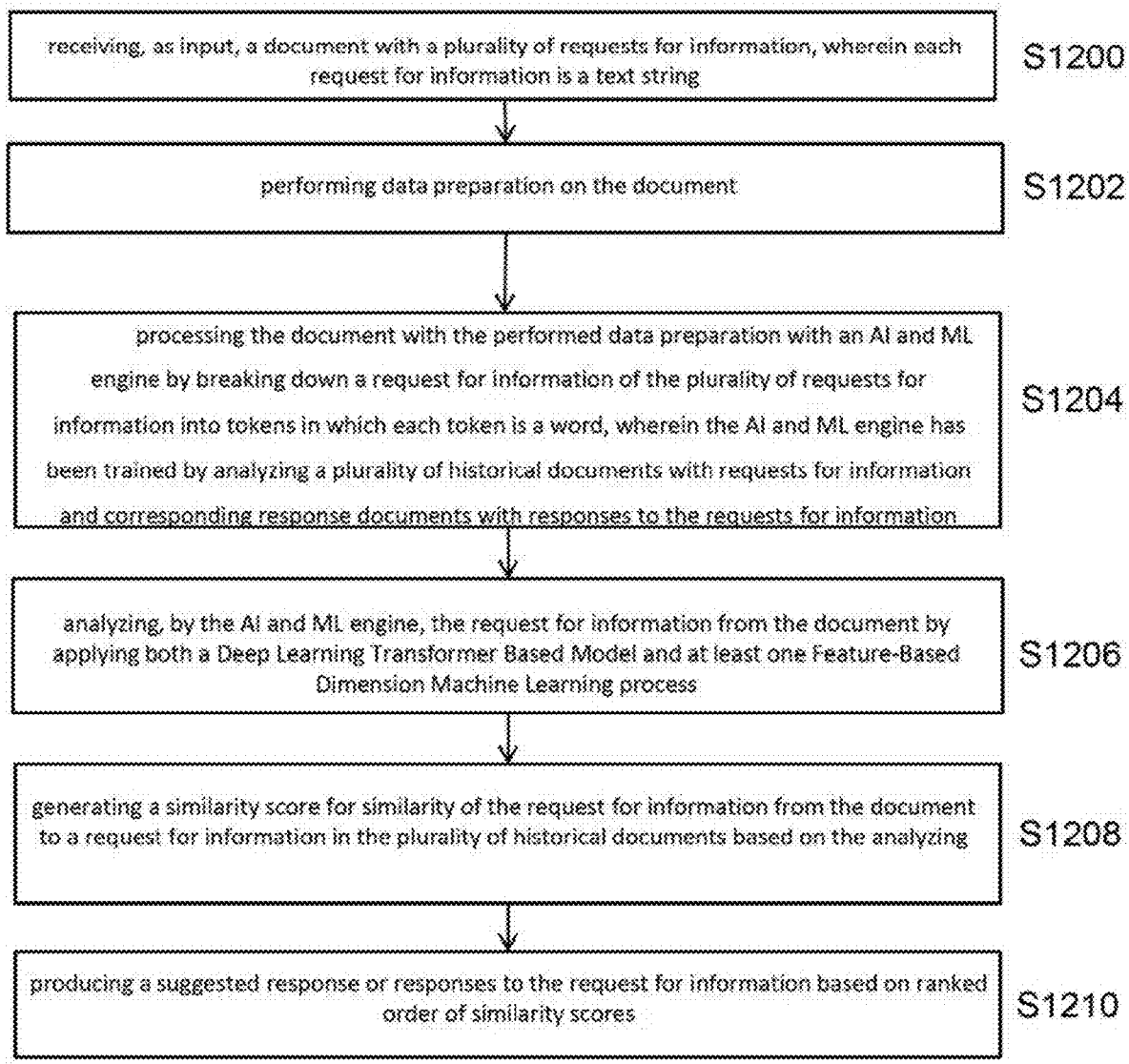
FIG. 12 is a flow diagram illustrating a document response production method in accordance with exemplary embodiments.

FIG. 12 is a flow diagram illustrating a document response production method in accordance with exemplary embodiments. The document response production method includes, in step S1200, receiving, as input, a document with a plurality of requests for information. For example, see step S410 of FIG. 3F. In an exemplary embodiment, each request for information is a text string. Step S1202 includes performing data preparation on the document. For example, the data preparation described/shown at step S412 of FIG. 3G can be performed on the request document. Step S1204 includes processing the document with the performed data preparation with an AI and ML engine by breaking down a request for information of the plurality of requests for information into tokens in which each token is a word. For example, see step S414 of FIG. 3H. The AI and ML engine has been trained by analyzing a plurality of historical documents with requests for information and corresponding response documents with responses to the requests for information. For example, the training steps of FIGS. 3A-3E. Step S1206 includes analyzing, by the AI and ML engine, the request for information from the document by applying both a Deep Learning Transformer Based Model and a Feature-Based Dimension Machine Learning process. In an exemplar embodiment, the Deep Learning Transformer Based Model and a Feature-Based Dimension Machine Learning process as described/shown in one or more FIGS. 3H-3I. Step S1208 includes generating a similarity score for similarity of the request for information from the document to a request for information in the plurality of historical documents based on the analyzing. In an exemplary embodiment, a composite similarity score as described/shown in FIGS. 5A-10I can be generated by the system (e.g., the AI and ML engine). It is also possible that one of the semantic similarity scores and the feature tag similarity score can be generated by the system (e.g., the AI and ML engine). Step S1210 includes producing a suggested response or responses to the request for information (e.g., the response in text box 110) based on ranked order of similarity scores. See for example, steps S418 and S420, and FIGS. 5A-5I.

In an exemplary embodiment, the document is a request for production, subpoena, an interrogatory, a demand letter, or a complaint for a legal proceeding.

In an exemplary embodiment, the Deep Learning Transformer Based Model that is applied uses one or more of Bidirectional Encoder Representations from Transformers (BERT), RoBERTa, word embeddings, and Word Movers Distance (WMD).

In an exemplary embodiment, the Feature-Based Dimension Machine Learning process includes one or more of clustering, a k-nearest neighbors (KNN) algorithm, agglomerative clustering, a support vector machine (SVM) method, logistic regression, Naive Bayes, decision trees, conditional random fields (CRF), and bi-directional long-short term memory (Bi-LSTM).

In an exemplary embodiment, the training of the AI/ML engine includes: receiving the plurality of historical documents with requests for information and the corresponding response documents with the responses to the requests for information. See, for example, step S402 of FIG. 3A in which the user uploads pairs of requests and responses. The training of the AI engine can also include sorting the plurality of historical documents with requests for information and the corresponding response documents with the responses to the requests for information by document type (e.g., interrogatory, subpoena, demand letter, etc.); removing stop words (e.g., of, the, etc.) from the plurality of historical documents with requests for information and the corresponding response documents with the responses to the requests for information by document type; NER replacement of certain terms or words in the plurality of historical documents with requests for information and the corresponding response documents with the responses to the requests for information by document type; and performing active learning by the user to backpropagate data regarding the plurality of historical documents with requests for information and sorting the corresponding response documents with the responses to the requests for information by document type. For example, see step S404 of FIG. 3B.

In an exemplary embodiment, the training of the AI/ML engine includes identifying and evaluating the tokens. For example, see step S406 of FIG. 3C.

In an exemplary embodiment, the training of the AI/ML engine includes adding a metadata field to the plurality of historical documents with requests for information and the corresponding response documents.

In an exemplary embodiment, the training of the AI/ML engine includes pairing each historical request for information with its corresponding historical response, and assigning an identifier to each pair. For example, the identifier can be the same or similar to the Request ID of FIG. 3E.

In an exemplary embodiment, a Deep Learning Transformer Based Model similarity score (e.g., the semantic similarity score of FIG. 5I) is generated for the Deep Learning Transformer Based Model and a Feature-Based Dimension Machine Learning process similarity score (e.g., the Feature Tag similarity score of FIG. 5I) is generated for the Feature-Based Dimension Machine Learning process.

In an exemplary embodiment, the similarity score (e.g., the composite similarity score, third column of FIG. 5I) is based on the Deep Learning Transformer Based Model similarity score (e.g., the semantic similarity score of FIG. 5I) and the Feature-Based Dimension Machine Learning process similarity score (e.g., the Feature Tag similarity score of FIG. 5I).

In an exemplary embodiment, a non-transitory computer-readable storage medium storing thereon executable instructions which when executed by processing circuitry causes the processing circuitry to perform a document response production method. The document response production method includes receiving, as input, a document with a plurality of requests for information, wherein each request for information is a text string; performing data preparation on the document; and processing the document with the performed data preparation with an AI/ML engine by breaking down a request for information of the plurality of requests for information into tokens in which each token is a word. The AI/ML engine has been trained by analyzing a plurality of historical documents with requests for information and corresponding response documents with responses to the requests for information. The method also includes analyzing, by the AI/ML engine, the request for information from the document by applying both a Deep Learning Transformer Based Model and a Feature-Based Dimension Machine Learning process; generating a similarity score for similarity of the request for information from the document to a request for information in the plurality of historical documents based on the analyzing; and producing a suggested response or responses to the request for information based on a highest similarity score.

In an exemplary embodiment, a system (e.g., a system including components of FIG. 13) is provided for performing production of a document. The system includes processing circuitry; and a non-transitory computer-readable storage medium. The non-transitory computer-readable storage medium storing thereon executable instructions which when executed by the processing circuitry causes the processing circuitry to: receive, as input, a document with a plurality of requests for information, wherein each request for information is a text string; perform data preparation on the document; process the document with the performed data preparation with an AI/ML engine by breaking down a request for information of the plurality of requests for information into tokens in which each token is a word, wherein the AI/ML engine has been trained by analyzing a plurality of historical documents with requests for information and corresponding response documents with responses to the requests for information; analyze, by the AI/ML engine, the request for information from the document by applying both a Deep Learning Transformer Based Model and a Feature-Based Dimension Machine Learning process; generate a similarity score for similarity of the request for information from the document to a request for information in the plurality of historical documents based on the analyzing; and produce a suggested response or responses to the request for information based on a highest similarity score.

Figure 13:
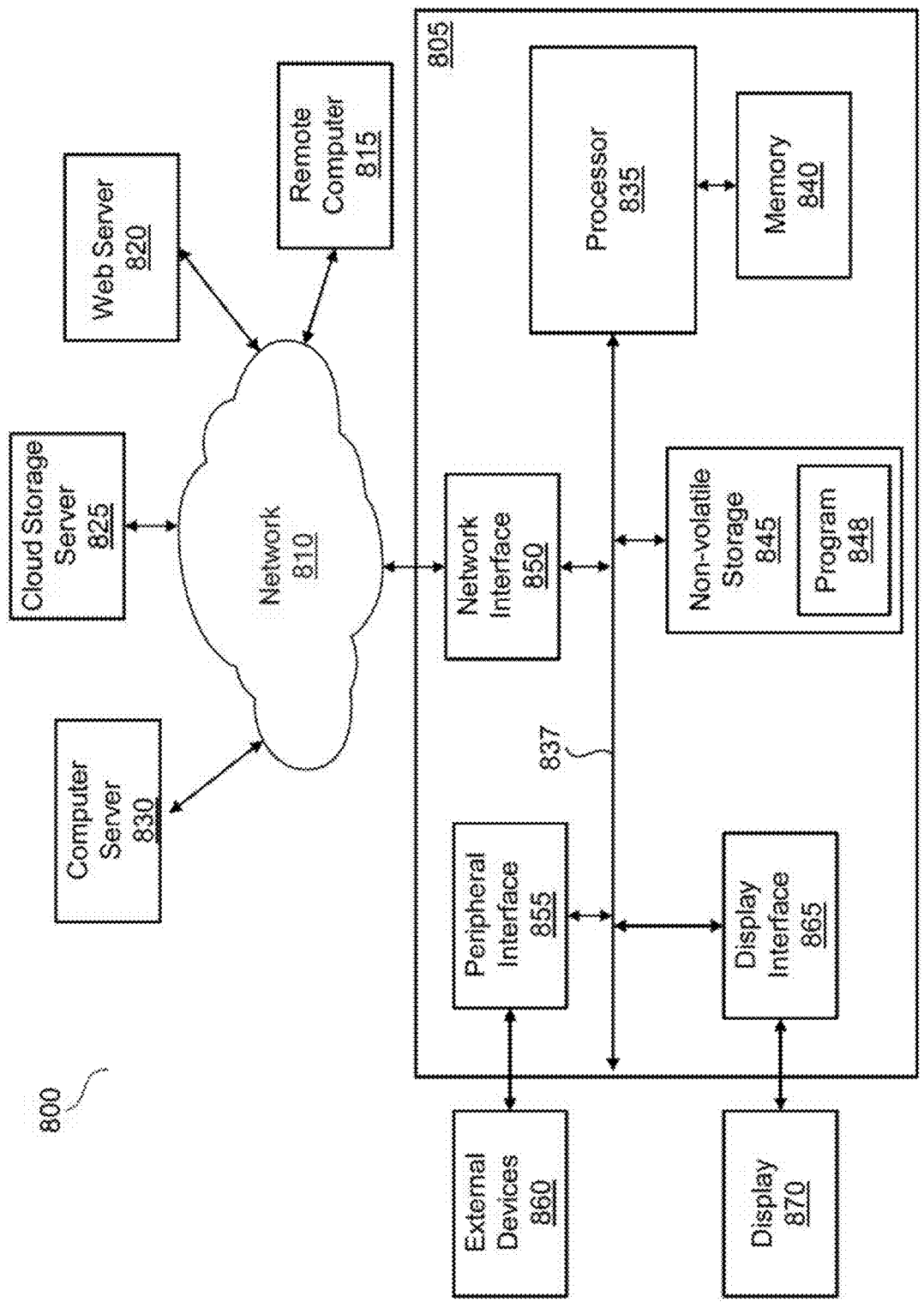
FIG. 13 is a block diagram of a computer-based system on which embodiments of the present system may be implemented.

FIG. 13 illustrates a block diagram of a computer that may implement the various embodiments described herein.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C#, Elixir or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 8 is a functional block diagram illustrating a networked system 800 of one or more networked computers and servers. In an embodiment, the hardware and software environment illustrated in FIG. 8 may provide an exemplary platform for implementation of the software and/or methods according to the present disclosure.

Referring to FIG. 8, a networked system 800 may include, but is not limited to, computer 805, network 810, remote computer 815, web server 820, cloud storage server 825 and computer server 830. In some embodiments, multiple instances of one or more of the functional blocks illustrated in FIG. 8 may be employed.

Additional detail of computer 805 is shown in FIG. 8. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, Display-Port and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

The methods discussed herein can employ deep learning algorithms which are described in academic literature as Recursive Neural Tensor Networks or as Recurrent Neural Networks (RNNs) with either Long Short-Term Memory (LSTM) or Gated Recurrent Units (GRUs). Those of skill in the arts will appreciate that use of other algorithms, including those which are now open-sourced, are contemplated.

Advantages of the disclosed system over the current method of producing legal documents with pre-existing templates includes greater efficiency as the system automatically produces and inserts the response in reply to a request; the automatic production of a response also results in cost savings as the time of an attorney or staff member working on the production of a legal document is reduced. Consistency is improved across an organization as the attorneys and staff are using the same system to create the legal documents. The disclosed system also improves/increases the functioning of the computing device as one user interface is able to simultaneously display all information that is needed for producing the document (e.g., the document viewer area, a virtual assistant area, and a text editor area). As the user interface displays all the information in one screen and the text editor is what you see is what you get, a user does not need to waste time by toggling and opening multiple screens when looking at historical or sample documents. Thus, multiple programs and multiple windows consuming a large amount of the computing device's memory is not required. This also results in less storage space (e.g., hard drive space) being used as well. As a result, the computing device will run more efficiently and use less power and generate less heat.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Obviously, numerous modifications and variations of the present disclosure are possible in light of the above teachings. It is therefore to be understood that within the scope of the appended claims, the disclosure may be practiced otherwise than as specifically described herein.

What is claimed is:

1. A document response production method executing on a computing device including processing circuitry, a display screen, and a non-transitory computer-readable medium storing executable instructions which when executed by the processing circuitry perform the method, the method comprising:
   receiving, as input via upload, a digital file of a document with a plurality of requests for information, wherein each request for information is a text string, and the document is a subpoena, an interrogatory, a demand letter, or a complaint for a legal proceeding;
   displaying, by the processing circuitry, a user interface on the display screen, the user interface simultaneously displaying a document viewer area, a virtual assistant area, and a text editor area;
   displaying the received document or other source materials in the document viewer area;
   receiving, as input, a selected request for information from among the plurality of requests for information;
   displaying, in the virtual assistant area, one or more automatically selected recommended responses to the selected request for information, and displaying, in the virtual assistant area, one or more other selectable potential responses;
   based on the selected request for information, automatically generating a text string response to the selected request for information by an artificial intelligence and machine learning (AI and ML) engine that has been trained by analyzing a plurality of sets of historical documents with requests for information and corresponding response documents with responses to the requests for information, wherein the historical documents include a subpoena, an interrogatory, a demand letter, or a complaint for a legal proceeding; and
   displaying the text string response in the text editor area, wherein the text string response is modifiable by user input.

2. The method of claim 1, wherein the one or more automatically selected recommended responses are determined by the AI and ML engine.

3. The method of claim 1, further comprising:
   receiving a user save operation input; and
   saving, in the non-transitory computer-readable medium or another non-transitory computer-readable medium, the text string response.

4. The method of claim 3, further comprising:
   producing a response document including the text string response.

5. The method of claim 4, further comprising:
   displaying the response document on the display screen; and
   printing, with a printer, the response document.

6. The method of claim 1, wherein the document is a request for production.

7. A non-transitory computer-readable storage medium storing thereon executable instructions which when executed by processing circuitry causes the processing circuitry to perform a document response production method, the document response production method comprising:
   receiving, as input via upload, a digital file of a document with a plurality of requests for information, wherein each request for information is a text string, and the document is a subpoena, an interrogatory, a demand letter, or a complaint for a legal proceeding;
   displaying a user interface on a display screen, the user interface simultaneously displaying a document viewer area, a virtual assistant area, and a text editor area;
   displaying the received document or other source materials in the document viewer area;
   receiving, as input, a selected request for information from among the plurality of requests for information;
   displaying, in the virtual assistant area, one or more automatically selected recommended responses to the selected request for information, and displaying, in the virtual assistant area, one or more other selectable potential responses;

based on the selected request for information, automatically generating a text string response to the selected request for information by an artificial intelligence and machine learning (AI and ML) engine that has been trained by analyzing a plurality of sets of historical documents with requests for information and corresponding response documents with responses to the requests for information, wherein the historical documents include a subpoena, an interrogatory, a demand letter, or a complaint for a legal proceeding; and displaying the text string response in the text editor area, wherein the text string response is modifiable by user input.

8. A document response production method, the method comprising:

receiving, as input via upload, a digital file of a document with a plurality of requests for information, wherein each request for information is a text string, and the document is a subpoena, an interrogatory, a demand letter, or a complaint for a legal proceeding;

performing data preparation on the document;

processing the document with the performed data preparation with an AI and ML engine by breaking down a request for information of the plurality of requests for information into tokens in which each token is a word, wherein the AI and ML engine has been trained by analyzing a plurality of sets of historical documents with requests for information and corresponding response documents with responses to the requests for information, wherein the historical documents include a subpoena, an interrogatory, a demand letter, or a complaint for a legal proceeding;

analyzing, by the AI and ML engine, the request for information from the document by applying both a Deep Learning Transformer Based Model and at least one Feature-Based Dimension Machine Learning process;

generating a similarity score for similarity of the request for information from the document to a request for information in the plurality of historical documents based on the analyzing; and producing a suggested response or responses to the request for information based on ranked order of similarity scores.

9. The document response production method of claim 8, wherein the document is a request for production.

10. The document response production method of claim 8, wherein the Deep Learning Transformer Based Model that is applied uses one or more of Bidirectional Encoder Representations from Transformers (BERT), ROBERTa, word embeddings, and Word Movers Distance (WMD).

11. The document response production method of claim 8, wherein the Feature-Based Dimension Machine Learning process includes one or more of clustering, a k-nearest neighbors (KNN) algorithm, agglomerative clustering, a support vector machine (SVM) method, logistic regression, Naive Bayes, decision trees, conditional random fields (CRF), and bi-directional long-short term memory (Bi-LSTM).

12. The document response production method of claim 8, wherein the training of the AI and ML engine includes:

receiving the plurality of historical documents with requests for information and the corresponding response documents with the responses to the requests for information;

sorting the plurality of historical documents with requests for information and the corresponding response documents with the responses to the requests for information by document type;

removing stop words from the plurality of historical documents with requests for information and the corresponding response documents with the responses to the requests for information by document type;

replacing Named Entity Recognition (NER) terms or words in the plurality of historical documents with requests for information and the corresponding response documents with the responses to the requests for information by document type; and performing active learning by a user to backpropagate data regarding the plurality of historical documents with requests for information and sorting the corresponding response documents with the user's responses to the requests for information by document type.

13. The document response production method of claim 8, wherein the training of the AI and ML engine includes identifying and evaluating the tokens.

14. The document response production method of claim 8, wherein the training of the AI and ML engine includes adding a metadata field to the plurality of historical documents with requests for information and the corresponding response documents.

15. The document response production method of claim 8, wherein the training of the AI and ML engine includes pairing each historical request for information with its corresponding historical response, and assigning an identifier to each pair.

16. The document response production method of claim 8, wherein a semantic Deep Learning Transformer Based Model similarity score is generated for the Deep Learning Transformer Based Model and a Feature-Based Dimension Machine Learning process similarity score is generated for the Feature-Based Dimension Machine Learning process.

17. The document response production method of claim 16, wherein the similarity score is based on the semantic Deep Learning Transformer Based Model similarity score and the Feature-Based Dimension Machine Learning process similarity score.

18. A non-transitory computer-readable storage medium storing thereon executable instructions which when executed by processing circuitry causes the processing circuitry to perform a document response production method, the document response production method comprising:

receiving, as input via upload, a digital file of a document with a plurality of requests for information, wherein each request for information is a text string, and the document is a subpoena, an interrogatory, a demand letter, or a complaint for a legal proceeding;

performing data preparation on the document;

processing the document with the performed data preparation with an AI and ML engine by breaking down a request for information of the plurality of requests for information into tokens in which each token is a word, wherein the AI and ML engine has been trained by analyzing a plurality of sets of historical documents with requests for information and corresponding response documents with responses to the requests for information, wherein the historical documents include a subpoena, an interrogatory, a demand letter, or a complaint for a legal proceeding;

analyzing, by the AI and ML engine, the request for information from the document by applying both a semantic Deep Learning Transformer Based Model and a Feature-Based Dimension Machine Learning process;

generating a similarity score for similarity of the request for information from the document to a request for information in the plurality of historical documents based on the analyzing; and producing a suggested response or responses to the request for information based on ranked order of similarity scores.

19. A system for performing response production to the requests in a document, comprising:

processing circuitry; and a non-transitory computer-readable storage medium storing thereon executable instructions which when executed by the processing circuitry causes the processing circuitry to:

receive, as input via upload, a digital file of the document with a plurality of requests for information, wherein each request for information is a text string, and the document is a subpoena, an interrogatory, a demand letter, or a complaint for a legal proceeding;

perform data preparation on the document;

process the document with the performed data preparation with an AI and ML engine by breaking down a request for information of the plurality of requests for information into tokens in which each token is a word, wherein the AI and ML engine has been trained by analyzing a plurality of sets of historical documents with requests for information and corresponding response documents with responses to the requests for information, wherein the historical documents include a subpoena, an interrogatory, a demand letter, or a complaint for a legal proceeding;

analyze, by the AI and ML engine, the request for information from the document by applying both a semantic Deep Learning Transformer Based Model and a Feature-Based Dimension Machine Learning process;

generate a similarity score for similarity of the request for information from the document to a request for information in the plurality of historical documents based on the analyzing; and suggest or produce a suggested response or responses to the request for information based on ranked order of similarity scores.

* * * * *